United States Patent [19]
Roslund et al.

[11] Patent Number: 5,179,665
[45] Date of Patent: Jan. 12, 1993

[54] MICROPROCESSOR INFORMATION EXCHANGE WITH UPDATING OF MESSAGES BY ASYNCHRONOUS PROCESSORS USING ASSIGNED AND/OR AVAILABLE BUFFERS IN DUAL PORT MEMORY

[75] Inventors: Charles J. Roslund, Penn Hills Twp.; Linda L. Santoline, South Park; Albert W. Crew, Pittsburgh; Gilbert W. Remley, O'Hara Township; William D. Ghrist, III, Pittsburgh, all of Pa.

[73] Assignee: Westinghouse Electric Corp., Pittsburgh, Pa.

[21] Appl. No.: 436,112

[22] Filed: Nov. 13, 1989

Related U.S. Application Data

[63] Continuation of Ser. No. 66,676, Jun. 24, 1987, abandoned.

[51] Int. Cl.$^5$ ............................................. G06F 13/00
[52] U.S. Cl. .................................. 395/250; 364/DIG. 1; 364/239; 364/284.3; 364/244.8; 395/200
[58] Field of Search ............... 364/134, 200 MS File, 364/900 MS File; 395/250, 200

[56] References Cited

U.S. PATENT DOCUMENTS

| | | | |
|---|---|---|---|
| 3,710,349 | 1/1973 | Miwa et al. | |
| 3,997,875 | 12/1976 | Broeren | 364/200 |
| 4,167,789 | 1/1979 | Faustini | 364/900 |
| 4,290,103 | 9/1981 | Hattori | 364/200 |
| 4,298,954 | 11/1981 | Bigelow et al. | 364/900 |
| 4,333,143 | 6/1982 | Calder | 364/200 |
| 4,345,325 | 8/1982 | Gandini et al. | 370/29 |
| 4,378,594 | 3/1983 | Kenyon | 364/900 |
| 4,396,995 | 8/1983 | Grau | 364/200 |
| 4,410,944 | 10/1983 | Kronies | 364/200 |
| 4,494,190 | 1/1985 | Peters | 364/200 |
| 4,509,115 | 4/1985 | Manton et al. | 364/DIG. 1 |
| 4,709,326 | 11/1987 | Robinson | 364/200 |

FOREIGN PATENT DOCUMENTS

| | | |
|---|---|---|
| 0094177 | 11/1983 | European Pat. Off. |
| 8505709 | 12/1985 | World Int. Prop. O. ........... 364/134 |

OTHER PUBLICATIONS

Reference Safety Analysis Report, vol. IV, (Resar 414), pp. 7i, 7.1-25 through 7.1-33 and FIGS. 7.1-13 and 7.1-14.

Primary Examiner—Lawrence E. Anderson
Attorney, Agent, or Firm—J. C. Spadacene

[57] ABSTRACT

Updated images of messages are passed between asynchronous digital processors using dual port shared memory. In the basic form of the invention, three buffers in shared memory are assigned to each message. Where one of the processors is a controller for a data link channel carrying n messages, $2n+1$ buffers are provided in free shared memory space with 2 buffers assigned to each message at all times and a common buffer serving as the third buffer for all of the messages. Where linked buffers in local memory of a controller processor receive message updates from a data highway, two buffers in shared memory are assigned to each message and a linked buffer in the controller local memory serves as the third buffer. The buffers containing the message updates are passed between processors by use of a buffer status array in shared memory. A semaphore lock in the array permits only one processor at a time to assign or release buffers.

17 Claims, 19 Drawing Sheets

MICROPROCESSOR INFORMATION EXCHANGE WITH UPDATING OF MESSAGES BY ASYNCHRONOUS PROCESSORS USING ASSIGNED AND/OR AVAILABLE BUFFERS IN DUAL PORT MEMORY

This application is a continuation-in-part, of application Ser. No. 07/066,676 filed Jun. 24, 1987 now abandoned.

BACKGROUND OF THE INVENTION

1. Field of the Invention

This invention is directed to exchanging information between asynchronously operated digital processors using dual port shared memory. More particularly, it is directed to passing updated images of messages between processors operating on deterministic cycle times where the latest message is the most important.

2. Background Information

In distributed microprocessor-based systems, the exchange of information between processors is a fundamental communications function. In a typical distributed system, microprocessor boards are arranged in a "host"/"slave" type hierarchy, with one or more redundant "host" processors communicating with one or more of several different types of "slave" processors. The use of this architecture allows the slave processors to perform many standard system tasks, such as datalink or data highway communications, analog input processing, et cetera, while off-loading the host processor(s), which in turn coordinates the control of a system level application function.

With this arrangement, communication between the host and slave processors is of prime importance in order to optimize system throughput. One method by which the communications between the processors can be accomplished is through the use of a dual-port memory area on each slave processor board which can be accessed by the host processors via the system bus. The dual-port memory can be segmented into unidirectional buffer areas which are used to provide a continuously updated image of certain variables. Each buffer is either updated by the host processor and the flow of information passes from host-to-slave; or alternatively, each buffer is updated by the slave processor and the flow of information passes from slave-to-host. By defining the flow of information through shared memory as the simplex communication of constantly updated images, the communications requirements are simplified in that lost message detection and lost message recovery are not necessary. In other words, only the latest message image is important.

For each message which must be passed through shared memory, the buffer areas in dual-port memory on the slave processor must be accessed by both the slave and host processors. This leads to the possibility of data tearing, which may occur whenever more than one user is permitted to simultaneously access a given memory resource. Data tearing occurs when one processor writes to a memory area while it is being read by another processor. If this situation exists, it is possible that the processor reading the memory actually reads the "torn" pieces of two separate data values.

In order to prevent this data tearing phenomena from occurring, each memory area should be locked by the processor requiring buffer access. Typically, the memory lock is implemented in software via a semaphore. Whenever the semaphore is in the locked state, all other processors are denied access to the memory area controlled by the semaphore. The processor which has locked the semaphore is the only processor which can subsequently unlock it. The use of software semaphores eliminates the possibility of data tearing, but introduces the possibility of memory resource contention between the host and slave processors.

Because both the slave and the host processors are required to access the buffer areas in dual-port memory, it is necessary to ensure that these processors do not contend for a particular data buffer, as this would slow down the operation of the individual processors. Buffer contention can occur when only single or dual shared memory buffers are allocated for a particular piece of data. Buffer contention occurs when one processor is denied access to a buffer because that buffer is currently locked by another user. The processor which desires buffer access must wait for the other user to release the locked buffer.

For the single shared memory buffer allocation case, buffer contention problems are readily apparent. When messages are passed from "slave-to-host", the host processor must wait for the slave processor to update the data in the buffer and then release the buffer such that the host can access the newest data. While the host processor is accessing the data, the slave has no free area for updating the next message. For messages passed from "host-to-slave", the situation is identically reversed. Each processor must wait for the buffer to be in the correct state (either "idle" or "newest") before it may access the buffer. There is no guarantee that the buffer will be available at any given time.

When dual shared memory buffers are allocated for a single data entity, the method by which the dual buffers are acquired and released by the two processors is identical to that of the single shared memory buffer case, except for the additional buffer. The addition of another shared memory buffer eliminates many of the buffer contention problems of the single buffer case. However, because the host and slave processors run asynchronously, there are no real restrictions on the amount of time either processor can hold a buffer assigned to itself. Thus, buffer contention can occur even when dual buffers are used, as explained in the following scenario: assume that the slave processor is operating at a slower rate than its corresponding host processor. This implies that the slave processor will take longer to access and release a data buffer than the host processor. When messages are passed from host-to-slave, the host processor will update an "idle" buffer to the "newest" state. The slave processor acquires the newest data by assigning this "newest" buffer to itself. In the meantime, the host processor updates the second buffer with even newer data, and changes the status of this buffer to "newest". Still, the slave processor has not released its original buffer. Again, the host decides it must update the data image. However, because the states of the two buffers are "assigned to slave" and "newest", there is not an "idle" buffer available for the host to acquire. The host cannot gain access to the buffer which is assigned to the slave processor. It is not desirable for the host to reuse the buffer containing the newest data, because when the slave does release its buffer, there will be no "newest" data buffer for it to access. Thus, the host processor must wait until the slave releases its buffer before it can again update the data image. In this case, buffer contention prevents the data image from being updated.

Buffer contention is undesirable because it not only slows down the shared memory communications, it unnecessarily couples the operation of the host and slave processors. Buffer contention is particularly undesirable in real-time control and protection systems for complex processes, such as nuclear power plants, where the processors must be run on deterministic cycle times to assure that required functions are carried out in a timely manner, both for precise control and safe operation.

Accordingly, it is a primary object of the invention to provide a method and apparatus for exchanging information between asynchronous digital processors which avoids buffer contention, but permits the processors to operate on deterministic cycle times.

It is another object of the invention to provide such a method and apparatus which utilizes buffers in shared memory.

It is still another object of the invention to provide such a method and apparatus which utilizes an efficient allocation of buffers in the shared memory to reduce the number of buffers required for contention free exchange of multiple messages on a single physical communications channel.

It is yet another object of the invention to provide such a method and apparatus which permits multiple processors to read a single data entity without any reduction in data update time.

It is an additional object of the invention to provide such a method and apparatus in which the number of times the same data image is accessible is controllable.

SUMMARY OF THE INVENTION

These and other objects are realized by the invention which utilizes triple buffers to transfer updated message images between asynchronous digital processors. In its simplest form, the invention calls for the provision of three buffers in dual port shared memory. The buffers are passed between the sender and receiver digital processors without copying data from one buffer to the other, and using a scheme which avoids memory resource contention. More particularly, the processor which is sending an updated message image is initially assigned one of the buffers in shared memory. The updated message image to be passed to the receiver processor is entered into this buffer. The sender processor then releases this buffer, marking it as the buffer containing the newest update of the message image. The receiver processor, when it is ready to read the latest update of the message image, assigns to itself the buffer which is marked as containing the newest update of the message image. The updated message image in the buffer assigned to the receiver processor is then copied by the receiver processor and the buffer is released. With this arrangement, buffer contention is eliminated because with triple buffers, 1) a buffer is always available to hold the newest data, 2) a buffer is always available for the sender processor to update the message image, and 3) a buffer is always available for the receive processor to access. Only one processor at a time is permitted to assign or release buffers. While a buffer is being filled by the sender processor or buffer contents are being read by the receiver processor, the other processor is free to assign or release buffers.

The restriction on assigning and releasing buffers is imposed by providing in shared memory a buffer status table in which the processors set values of a restricted state variable to indicate buffer status. Access to the buffer status table is controlled by a semaphore lock which when acquired by one processor prevents access to the buffer status table by the other processor.

In accordance with another aspect of the invention, a plurality of asynchronous receiver processors may each receive the updated message images passed by the sender processor. In this embodiment of the invention, only one buffer at a time is assigned to the receiver processors, so that if a second receiver requests an update of the message while another receiver is copying the message, the buffer assigned to the receiver processors is not released until all of the receiver processors have copied the newest updated message image.

Where updated images of multiple messages are to be passed from the sender to the receiver processor, three buffers are assigned to each message in shared memory, in accordance with the broad concept of the invention. For serially transmitted messages, two schemes can be used to reduce the number of buffers required. In accordance with one scheme, buffers numbering two times the number of unique messages plus one are provided in shared memory. The buffers assigned to a particular message change as successive serial messages are received. Initially two buffers are assigned to each message and a common buffer serves as the third buffer which receives the next updated message image to be passed. This message image could correspond to any of the unique messages being passed by the sender. The sender processor determines which message is contained in the common buffer from the header of the message. The sender processor then determines which set of two shared memory buffers are associated with this message, and swaps the common buffer containing the updated message image with an idle buffer from the set of two buffers assigned to that message, with the latter buffer becoming the new common buffer. The receiver processor then acquires the buffer in shared memory containing the newest update of the message image, copies the message, and releases the buffer in the same manner as in the basic triple buffer scheme described above.

Since the common buffer is assigned to one of the processors, the role of sender and receiver is reversed when messages are being passed in the opposite direction. Thus, when the common buffer is assigned to the receiver processor, the sender processor operates the same as in the basic triple buffering arrangement, and the receiver processor swaps the buffer in shared memory containing the newest updated message image with the common buffer for reading the passed message. If the sender processor has not provided a later update of the message image, the buffer assigned to the receiver is released as the buffer containing the latest image of that message after the message has been read so that a newest image remains available for the receiver processor. Where multiple channels are provided, such as in a datalink system, and each channel carries n messages, where n is a variable having a separate value for each channel, 2n+1 buffers are provided in shared memory for each channel.

In the second scheme for reducing the number of shared memory buffers required for transmitting multiple messages, two buffers are assigned to each message in shared memory, and a local buffer in the sender processor is used as the third buffer. In this scheme, the updated message is entered into a local buffer and the sender processor then assigns to itself one of the two buffers in shared memory and copies the data into this buffer. This buffer is then released as the buffer containing the newest updated message image which is read by the receiver processor in the same manner as discussed above in connection with the basic triple buffer scheme. This scheme is used for instance where the sender processor is a controller for a data highway and linked buffers are provided in local memory for off loading messages from the data highway.

The invention embraces both the method and apparatus for performing the above functions.

BRIEF DESCRIPTIONS OF DRAWINGS

A full understanding of the invention can be gained from the following description of the preferred embodiments when read in conjunction with the accompanying drawings in which.

Figure 7A:
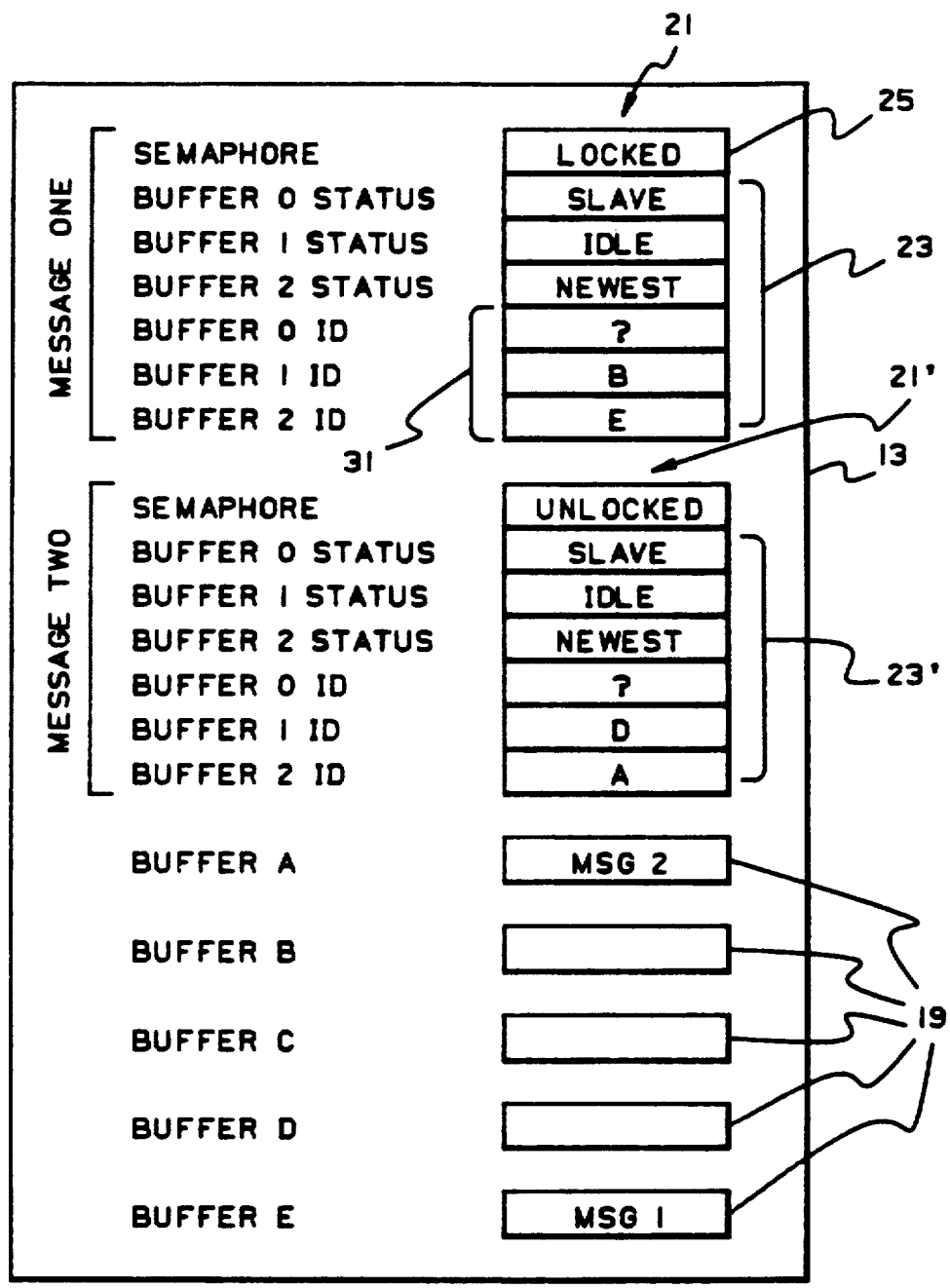
Figure 8A:
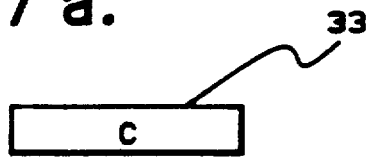
Figure 9A:
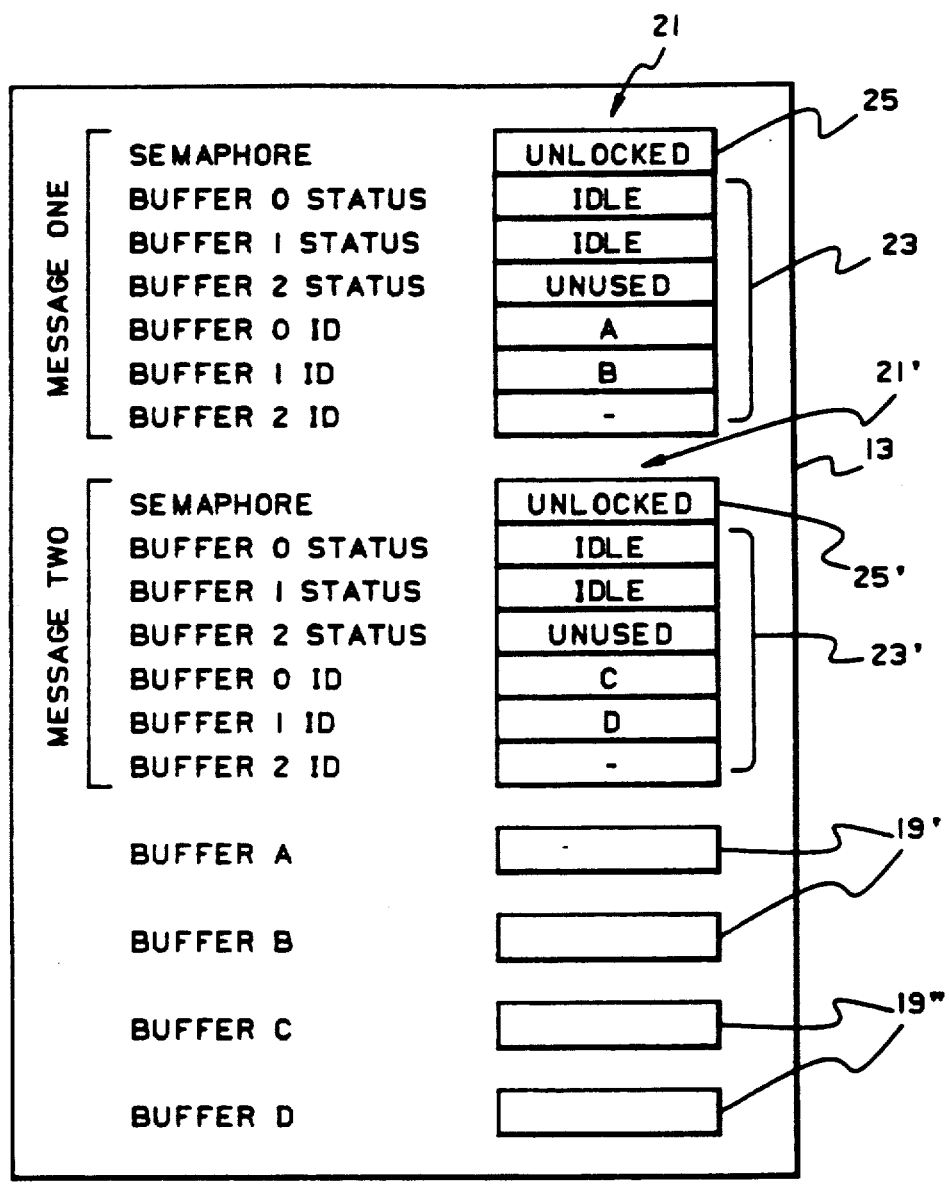
Figure 10A:
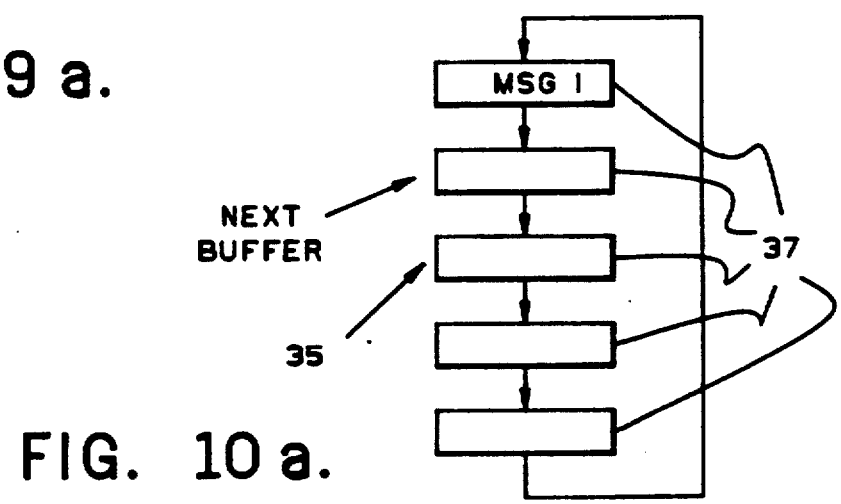
Figure 9B:
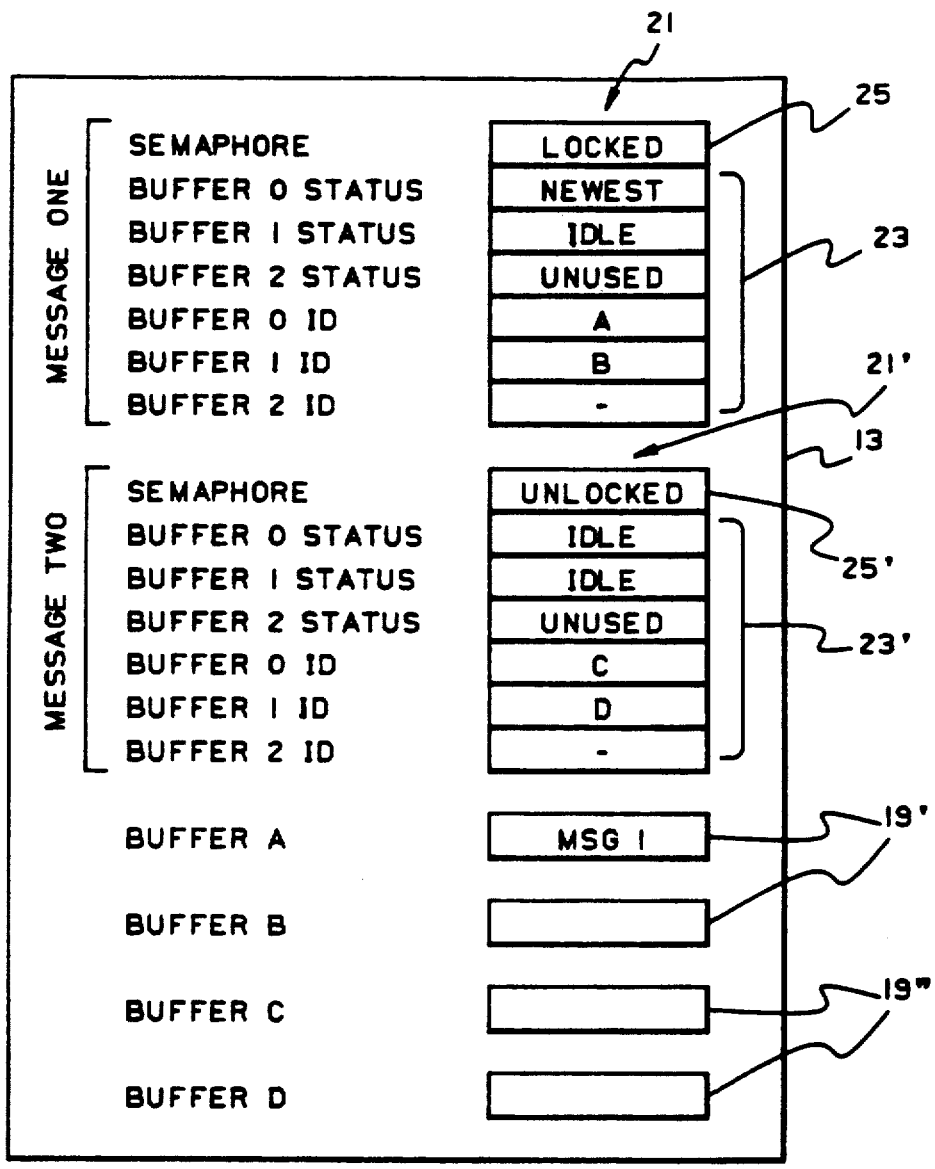
Figure 10B:
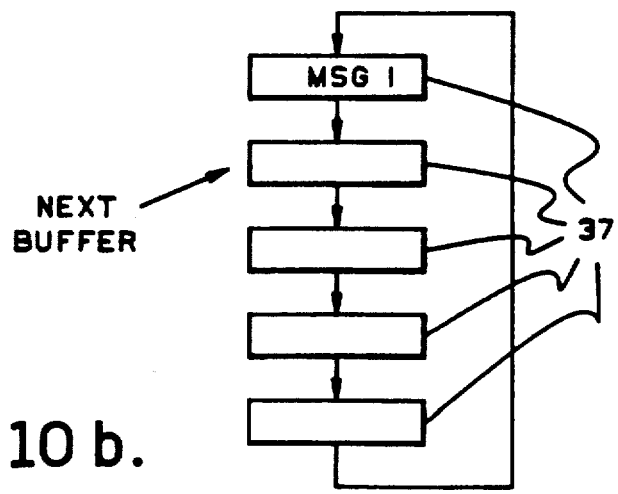
Figure 9C:
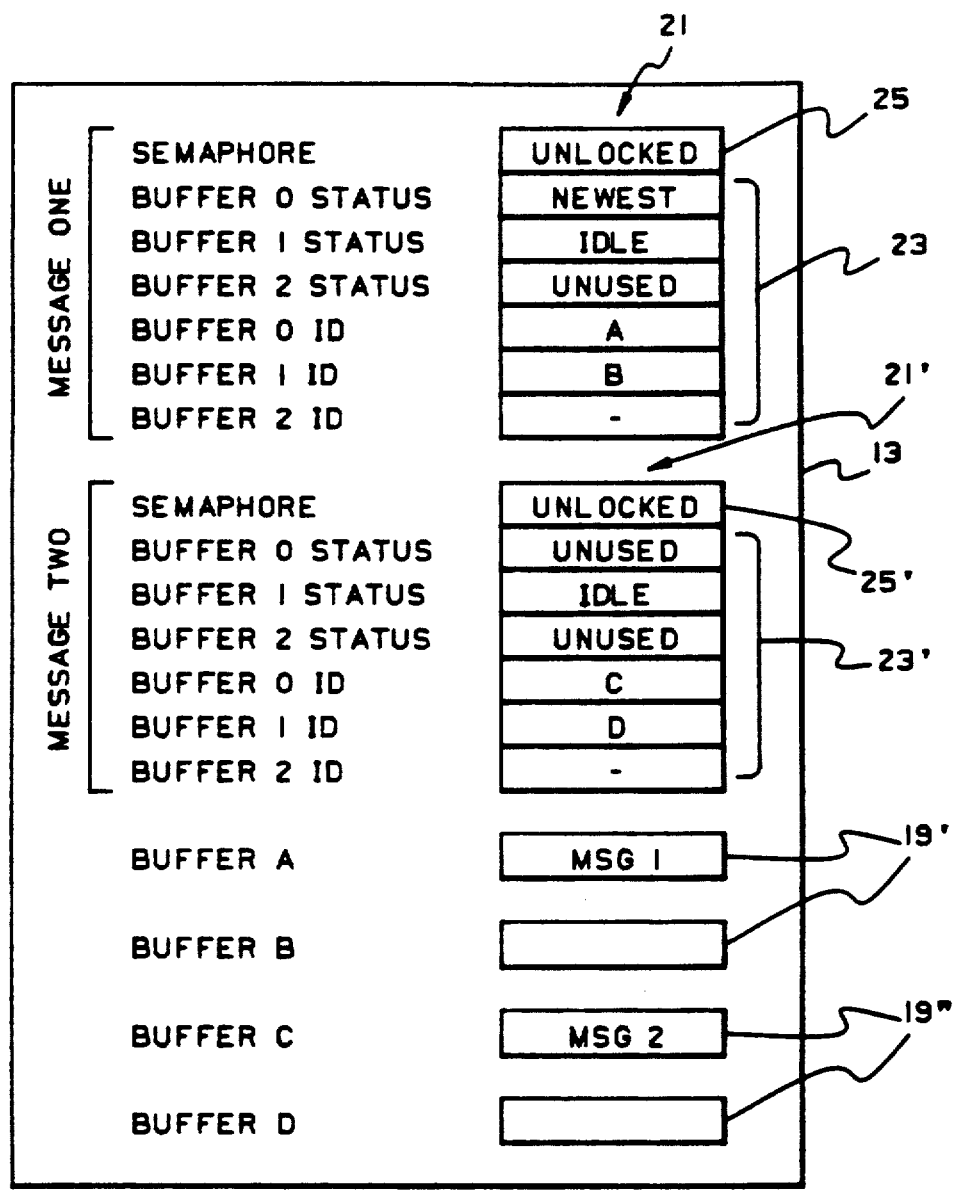

FIGS. 3a, 3b, 3c, 3d, 3e, 3f, 3g, 3h, 3i and j are schematic diagrams illustrating the organization of shared memory and the passage of messages between a single sender and a single receiver processor in accordance with the concepts of pure triple buffering;

FIGS. 4a, 4b, 4c, 4d, 4e and f are schematic diagrams illustrating the organization of shared memory and the passage of messages from a sin sender processor to multiple host processor buffering;

FIGS. 5a, 5b, 5c, 5d, and e are schematic diagrams illustrating the organization of shared memory for the passage of a plurality of messages between processors in accordance with another embodiment of the invention using two buffers for each message plus a common third buffer;

FIGS. 6a, 6b, 6c, 6d and e are schematic diagrams illustrating the assignment of the common buffer in local memory of the slave processor in accordance with the embodiment of the invention shown in FIGS. 5a through e, with figures bearing the same letter designation representing the same step of the process;

FIGS. 7a and b are schematic diagrams illustrating the passage of a second message between processors in accordance with the embodiment of the invention illustrated in FIGS. 5a through e;

FIGS. 8a and b are schematic diagrams illustrating the assignment of the common buffer in the local memory of the slave processor for the sequence shown in FIGS. 7a and b;

FIGS. 9a, 9b and c are schematic diagrams illustrating the organization of shared memory for the passage of a plurality of messages between processors in accordance with yet another embodiment of the invention using two buffers in shared memory for each message and one of a number of linked buffers in the local memory of the slave processor;

FIGS. 10a, 10b and c are schematic diagrams illustrating the linked buffers in local memory of the slave processor for the sequence of steps illustrated in FIGS. 9a through c.

DESCRIPTION OF THE PREFERRED EMBODIMENTS

Figure 1:
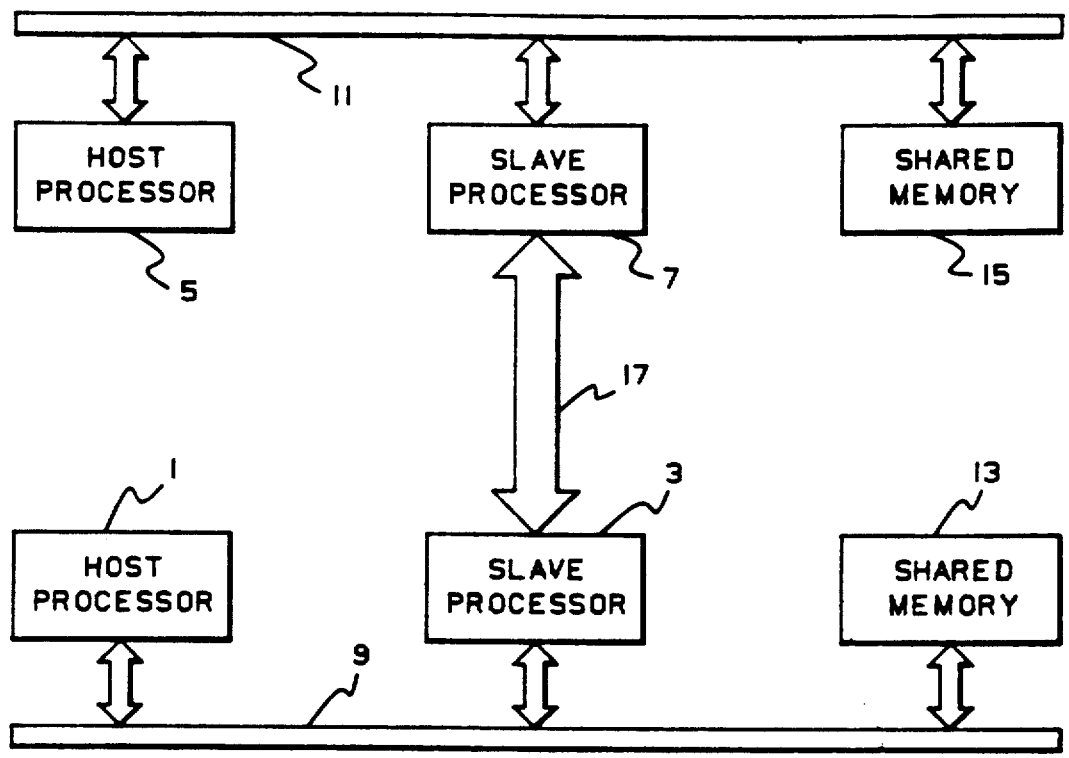
FIG. 1 is a block diagram of a multiprocessor system in accordance with the teachings of the invention.

FIG. 1 illustrates a multiprocessor system 1 having pairs of digital processors 1 and 3, and 5 and 7 with the processors in each pair connected by a common memory bus 9 and 11 to a shared memory 13 and 15 respectively. The two processors in each pair pass information back and forth through the associated shared memory in accordance with the invention. In the system of FIG. 1 the two pairs of processors are connected by a commnications link 17 such as a datalink or data highway. In this configuration, the processors 1 and 5 are host processors while processors 3 and 7 are slaves. The host processors perform application functions while the slave processors serve as communication controllers for controlling the flow of information between the host processors over the communications link 17. The communications link 17 transmits messages to slave processors 3 and 7 which place them in the shared memories 13 and 15, typically resident in the respective slave processors, for access by the respective host processors 1 and 5. For outgoing messages the host processors 1 and 5 place messages in the associated shared memory to be transmitted on the communications link by the slave. Such an arrangement is particularly suitable for multiprocessor based control and protection systems for complex process plants such as a nuclear power plant. In such applications the host processors operate on deterministic cycle times; that is they must perform specified functions within specified intervals for accuracy and safety in process control. They cannot wait for the slave processors. Likewise the slave .processors must meet specified time constraints in controlling the communications link, and cannot wait for the hosts. Thus the respective host and slave processors are run asynchronously with the cycle times of the host typically being much longer than that of the slave.

In a system such as that shown in FIG. 1, typical messages exchanged by the host processors are repetitively transmitted with each successive repetition representing an updated image of the message. Such messages can represent, for instance, process parameters or status values with the updated image representing the current value of the parameter or status state. In such a system, the latest value or latest updated image of the message is the most important. It is not critical to system operation if a message is lost, as long as a reasonably current image of the message is available.

While only two host processors, 1 and 5, and two slave processors, 3 and 7, are shown in FIG. 1 for clarity, a typical system would have many processors linked by communication links 17. The typical data link used as the communication link 17 may be single channel or multiple channel with each channel handing multiple messages. Data highways also typically handle a large number of messages.

In some multiprocessor applications, a single slave processor may serve as a communications controller for multiple host processors. Thus, in FIG. 2, the slave processor 3 inserts messages received from a communications link 17', such as a data highway, in shared memory 13' for use by two host processors 1 and 1'. The slave processor 3 in the configuration of FIG. 2 also transmits on the data highway 17' messages from both host processors 1 and 1'. As discussed above, a data link, either single or multiple channel, can be used as the communications link in place of the data highway 17' In addition, more than two host processors 1 and 1' can be served by the slave 3 in the arrangement of FIG. 2.

Information is passed between the host 1 and slave 3 processors in accordance with the invention by inserting messages in the shared memory 13. In the basic form of the invention, referred to herein as pure triple buffering, a set of triplicated buffers 19 is maintained in the shared memory 13 for each data entry which must be communicated from the host to slave processor or from the slave to the host processor as shown schematically in FIG. 3a. Information about the buffers 19 and access control to the buffers is provided via a Buffer Descriptor Table 21 in shared memory 13. Each set of triplicated buffers 19 has an associated buffer descriptor table 21 containing a three element buffer status array 23 and a semaphore location 25. The buffer status array 23 records the status of each of the three shared buffer memories 19. Each buffer 19 can have one of five buffer statuses: "idle", "assigned to host", "assigned to slave", "newest", and "unused". The semaphore 25 which controls access to the buffer status array 23 is a simple software lock which must be set by any processor 1 or 3 attempting to access the triplicated buffers 19.

The method in which the parameters of the buffer descriptor tables 21 are used varies according to the direction of information flow, and whether the processor desiring buffer access is a host 1 or slave 3 processor. The operation of the buffer descriptor tables 21 in pure triple buffering will be described with the use of the schematic diagrams of FIGS. 3a-j which show the successive states of the buffer descriptor table 21 entries as a message is passed from one processor to the other through shared memory.

HOST-TO-SLAVE MESSAGE PASSING

Host Processor Buffer Acquisition/Release

Figure 3A:
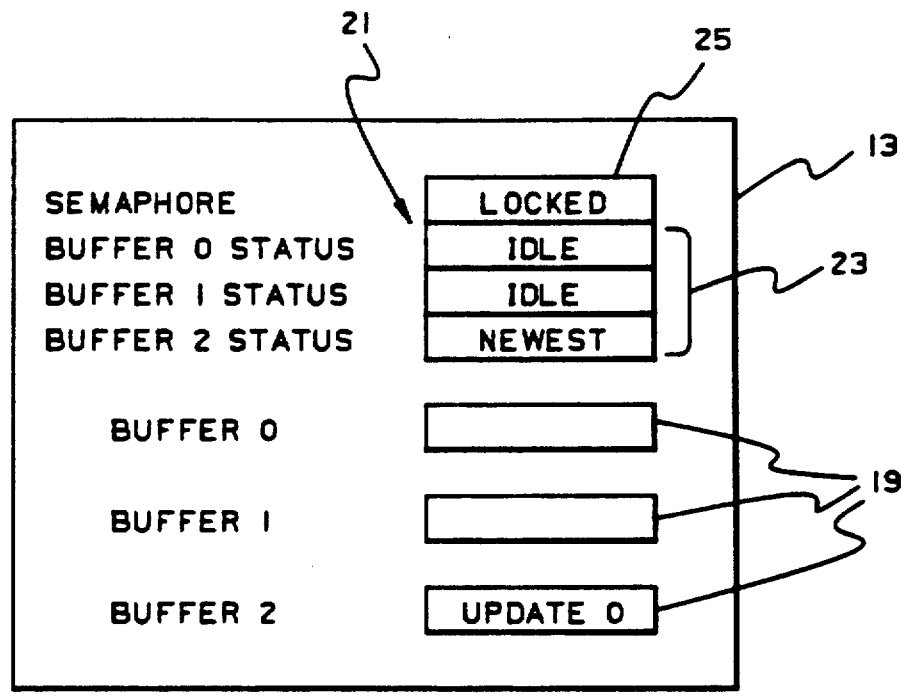
Figure 3B:
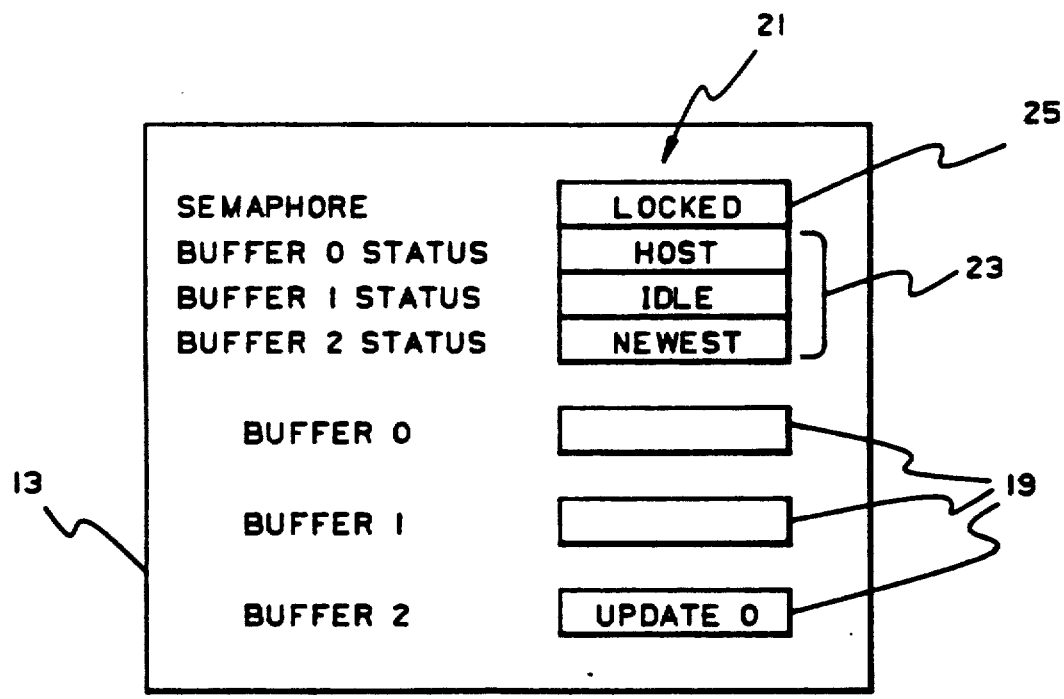

In host-to-slave message passing, the host processor 1 marks messages for use by the slave processor 3. The host processor 1 uses two separate procedures to access the shared memory data buffers 19: one to acquire an "idle" buffer, and a second to release the "assigned to host" buffer once the new message has been moved into the shared memory buffer 19. The actions which must be taken by the host processor 1 to acquire an "idle" buffer 19 are as follows:

1. The host processor 1 locks the buffer status array 23 by acquiring or locking the buffer descriptor table semaphore 25 as shown in FIG. 3a. Once the host processor has the semaphore 25 in a locked state, the slave processor 3 is denied access to the buffer status array 23. In the example of FIG. 3a, the last update of the message, update 0, is stored in Buffer 2 which has been assigned the status of "newest".
2. The buffer status array 23 is searched for a status of "idle". If an "idle" buffer is not found, then an error has occurred.
3. The buffer 19 whose status is "idle" is acquired by the host processor 1 by changing the status to "assigned to host", as illustrated in FIG. 3b in which the status of the Buffer 0 is abbreviated to "host".
4. The buffer descriptor table semaphore 25 is released (set to the unlocked state).

Figure 3C:
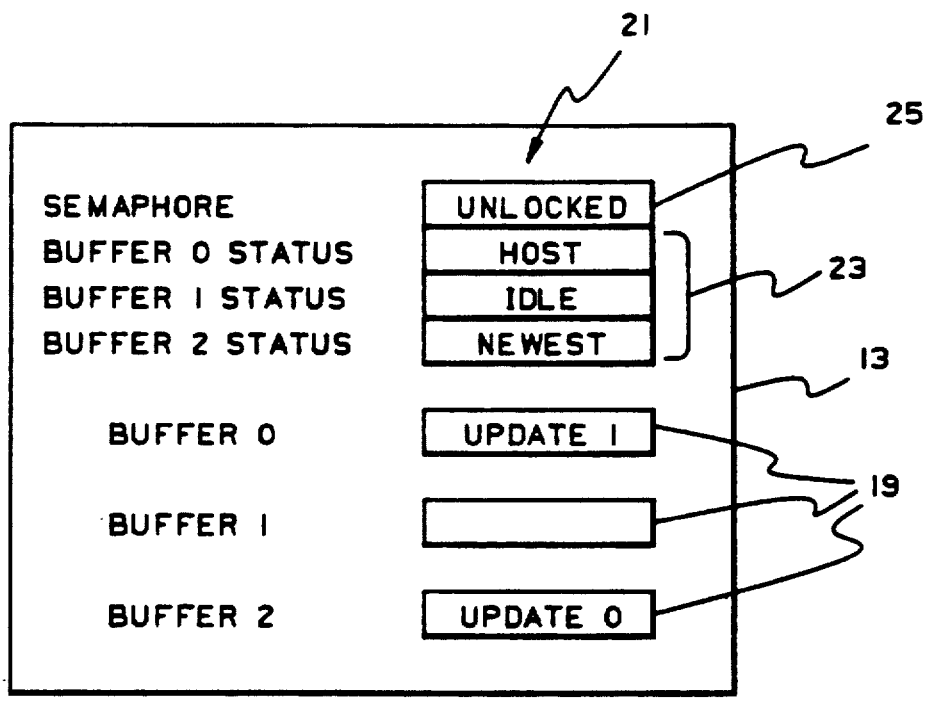
Figure 3D:
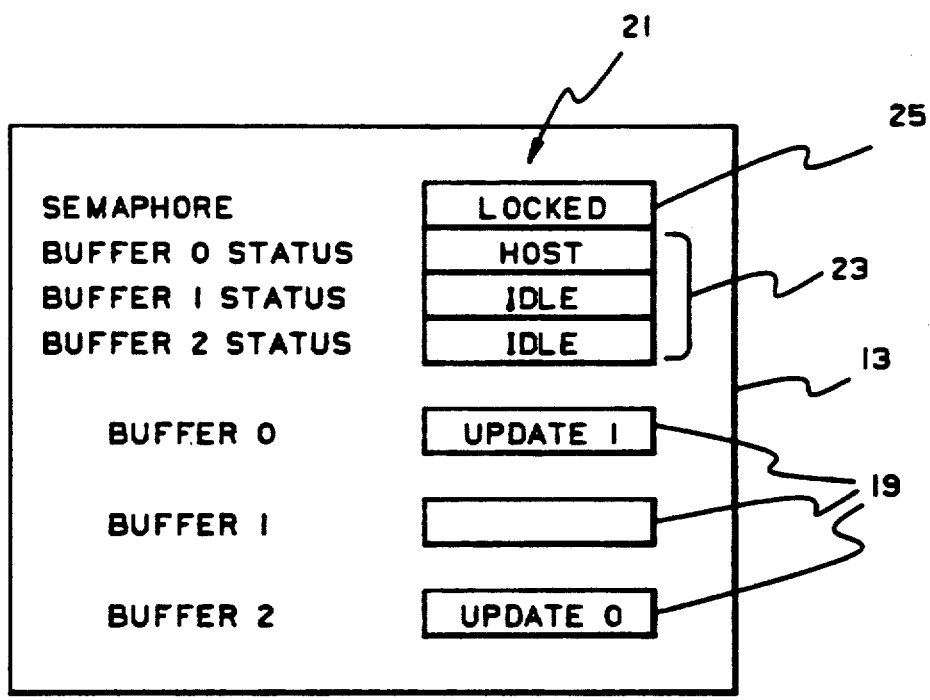
Figure 3E:
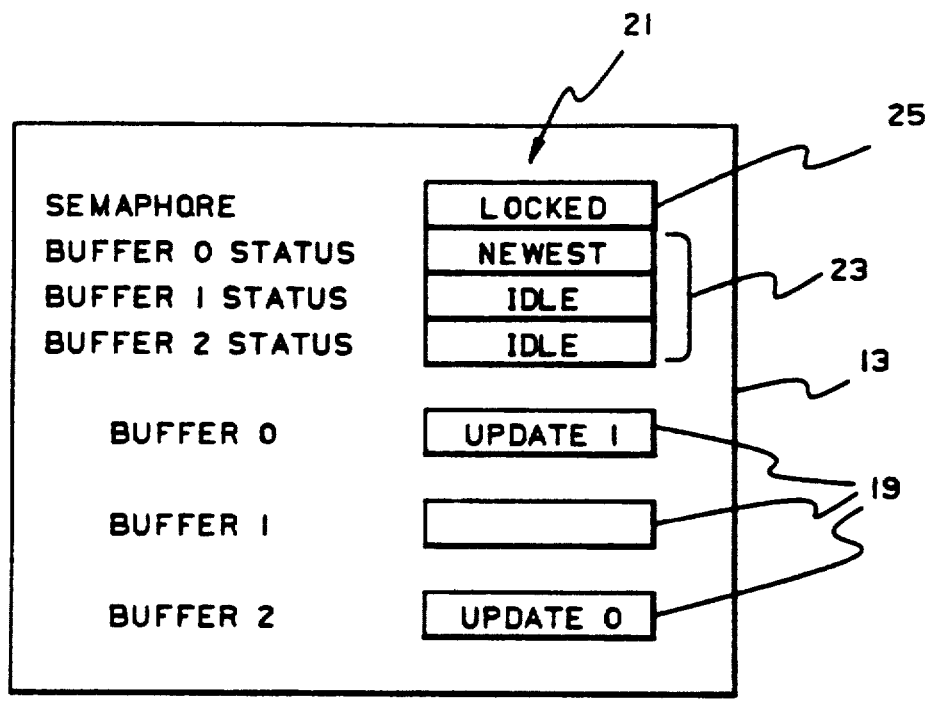

At this point, the host processor 1 moves the "newest" message image, "update 1", from its local memory into the acquired shared memory data buffer 19, Buffer 0, as shown in FIG. 3c. Notice that while this is occurring the semaphore 25 for the buffer descriptor table 21 is unlocked so that the slave processor 3, if it has need to, has access to the buffer descriptor table 21. Once data transfer into the "assigned to host" buffer 19 is complete, the host processor 1 must release this buffer, Buffer 0 in the example, so that the slave processor 3 can use the "newest" data. The procedure which the host processor 1 follows to release the buffer 19 is as follows:

1. The host processor 1 locks the buffer status array 23 by acquiring the buffer descriptor table semaphore 25. Once the host processor 1 has the semaphore in a locked state, the slave processor 3 is denied access to the buffer status array 23.
2. The buffer status array 23 is searched for a status of "newest". If a "newest" status is found, then the data which is being provided by the host processor (1) replaces this buffer, Buffer 2 in the example, so the buffer status of "newest" is changed to "idle" as shown in FIG. 3d.
3. The buffer status array 23 is searched for a status of "assigned to host". This is the buffer, Buffer 0, which has been filled with the "newest" data. If such a buffer is not found, an error has occurred.
4. The buffer 19 whose status is "assigned to host", Buffer 0, is changed to "newest" as shown in FIG. 3e.
5. The buffer descriptor table semaphore 25 is released.

Slave Processor Buffer Acquisition/Release

Figure 3F:
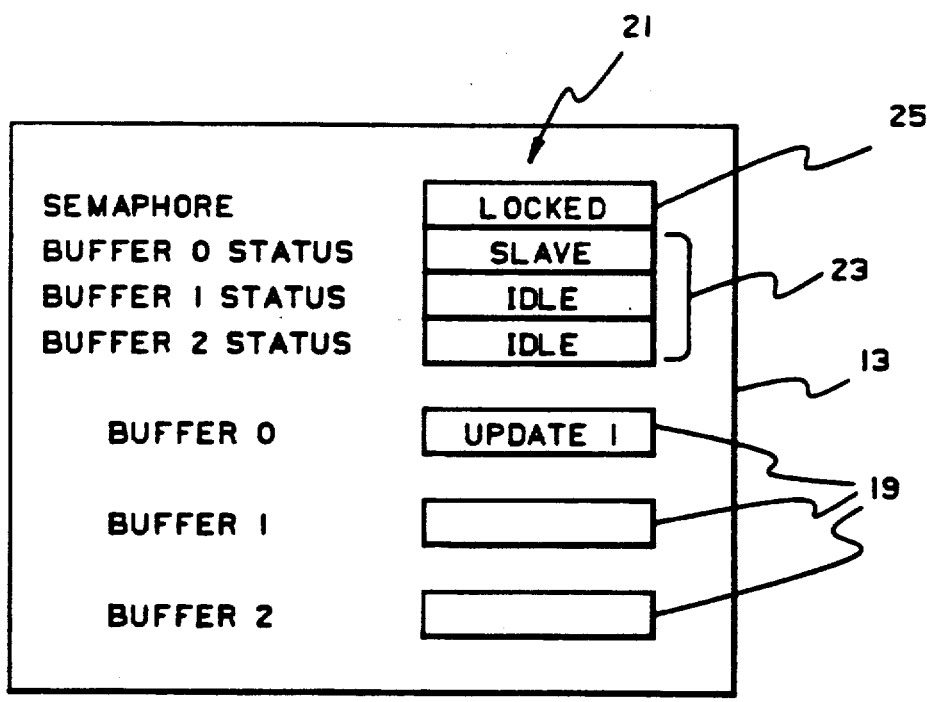
Figure 3G:
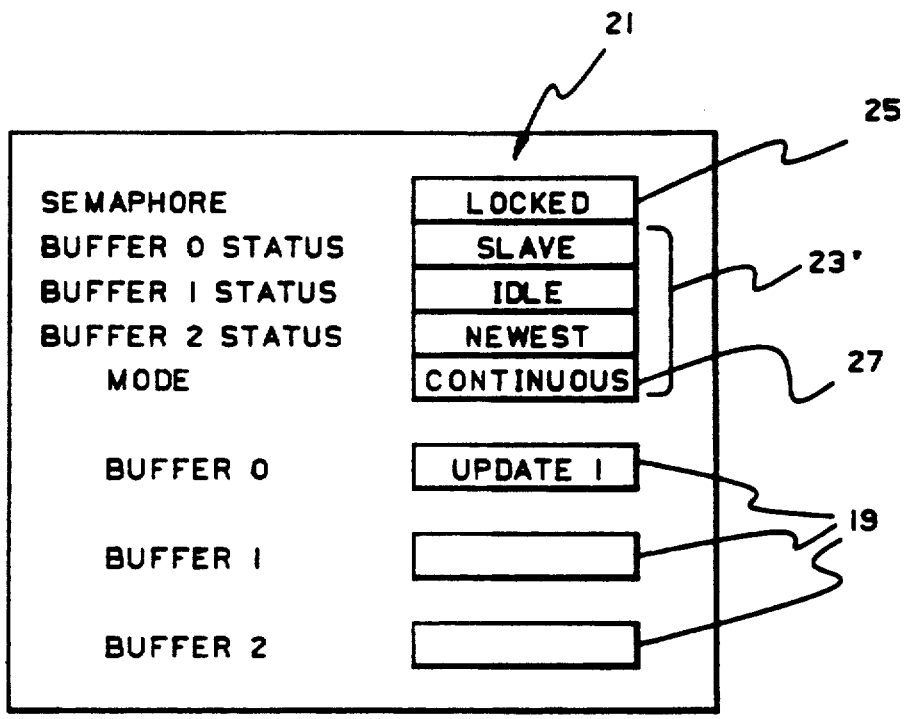

The slave processor 3 must access the newest message updates provided by the host processor 1. Two separate procedures are followed: one to acquire the "newest" buffer, and the second to release the "assigned to slave" buffer once the newest data has been used by the slave processor. The actions which must be taken by the slave processor 3 in order to access the "newest" data buffers are as follows:

1. The slave processor 3 locks the buffer status array 23 by acquiring the buffer descriptor table semaphore 25. Once the slave processor has the semaphore in the locked state, the host processor 1 is denied access to the buffer status array.
2. The buffer status array 23 is searched for a buffer 19 with a status of "newest".
3. If a "newest" buffer 19 is found, it is acquired for use by the slave processor by changing its status to "assigned to slave", as is illustrated in FIG. 3f in which the status of Buffer 0 is abbreviated to "slave". If a "newest" buffer 19 is not found, then the host processor 1 has not yet provided any message updates in shared memory 13.
4. The buffer descriptor table semaphore 25 is released.

Figure 3H:
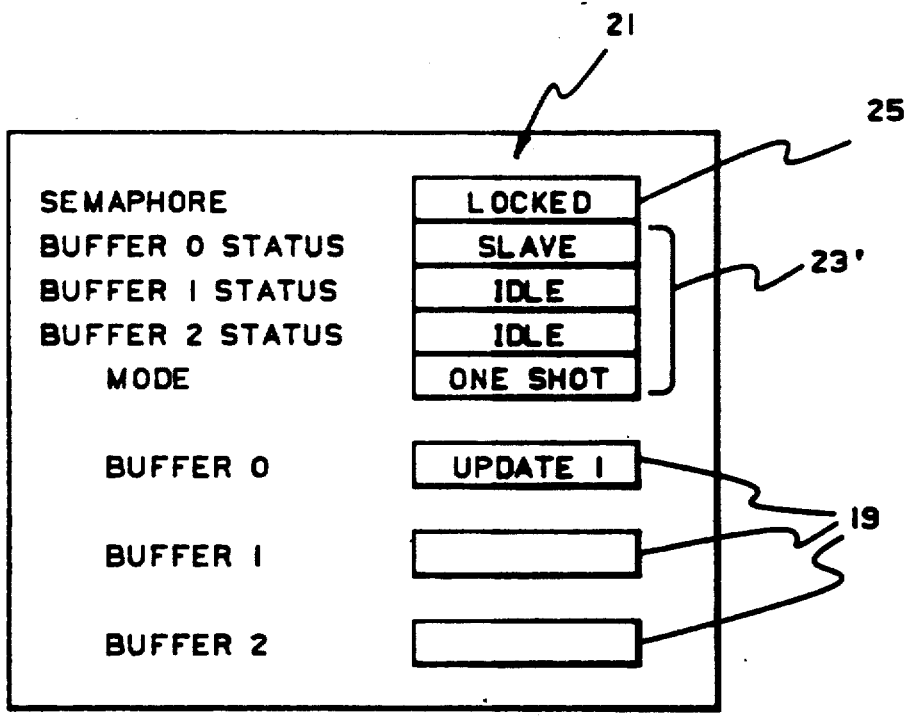
Figure 3I:
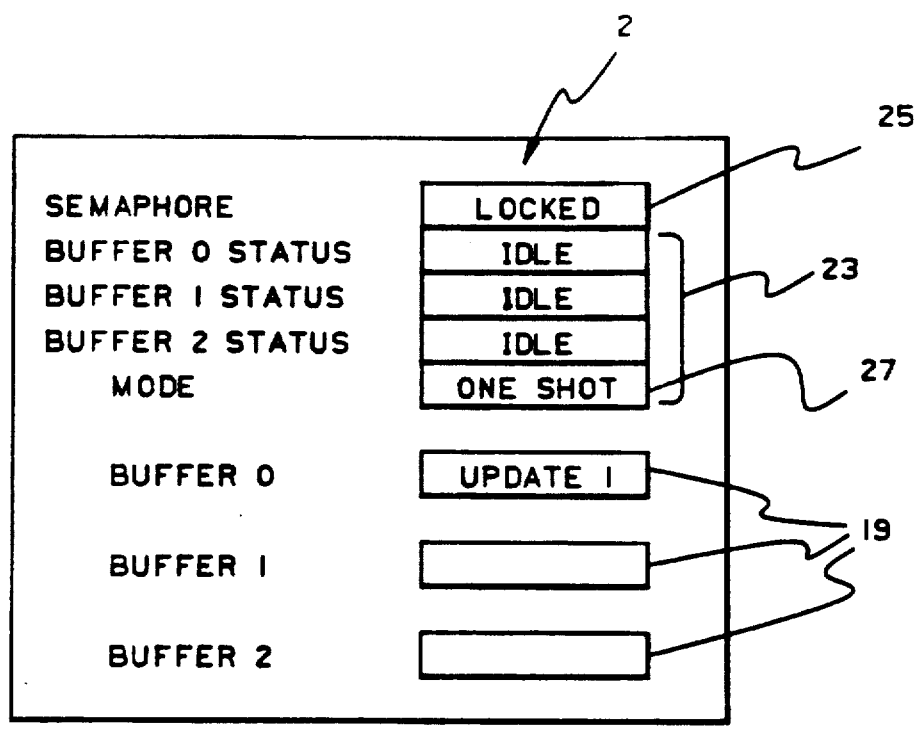
Figure 3J:
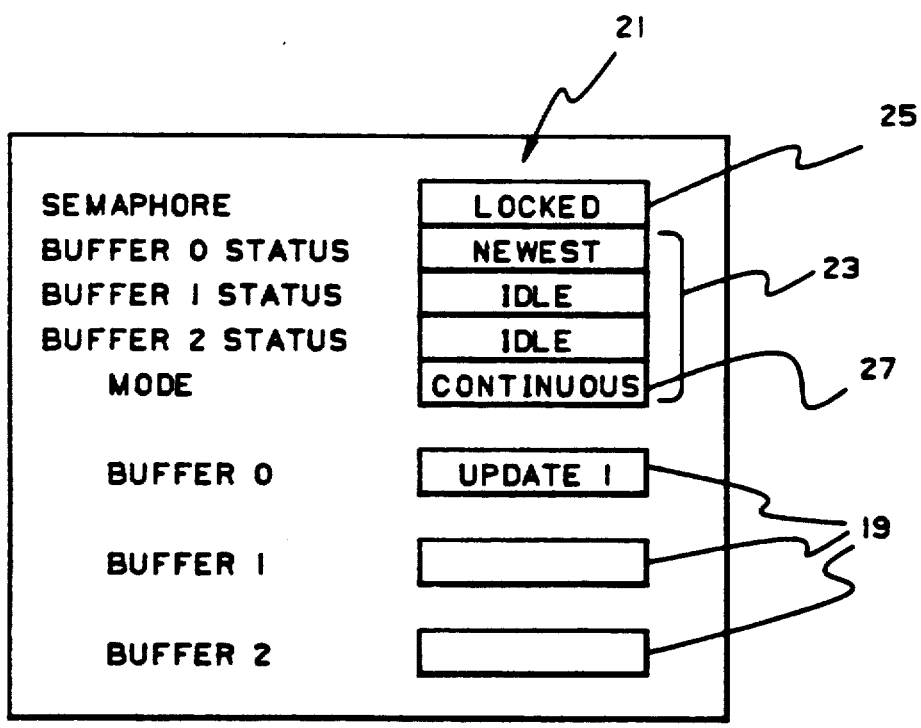

At this point, the slave processor 3 is free to use the data in the buffer 19 assigned to it. While this is occurring, the host processor 1 is free to acquire another buffer 19 to insert a newer update of the message in shared memory 13. When the slave processor 3 no longer requires access to the "assigned to slave buffer", this buffer 19 must be released for reuse by the host processor 1. The procedure which the slave 3 follows to release the buffer is as follows:

1. The slave processor 3 locks the buffer status array 23 by acquiring the buffer descriptor table semaphore 25. Once the slave processor 3 has the semaphore 25 in the locked state, the host processor 1 is denied access to the buffer status array 23.
2. The buffer status array 23 is searched for a buffer 19 with a status of "newest". If such a buffer is found, as indicated by Buffer 2 in the example of FIG. 3g, or if a Mode location 27 in the buffer descriptor table 21 indicates that each buffer is to be accessed only once, as indicated in FIG. 3h in which the Mode is designated "one shot", then the status of the buffer 19 to be released, Buffer 0 in the example, is changed to "idle" as shown in FIG. 3i. Otherwise, the buffer, 19, which is to released, Buffer 0 in the examples, still contains the "newest" data, and it is released by changing its status from "assigned to slave" back to "newest" as shown in FIG. 3j.

3. The buffer descriptor table semaphore 25 is then released.

The Mode location 27 in the buffer descriptor table 21 is used when it is desired to provide the ability to permit the host to read a message update only once, in which case the Mode is set to "one shot". If it desired that the latest message update be available continuously for the host processor to read, until a newer update is available, the Mode is set to "continuous".

Slave-To-Host Message Passing

In slave-to-host message passing, the slave processor 3 marks messages for use by the host processor 1. The process used by the slave processor in pure triple buffering is similar to that used by the host processor in sending messages to the slave except that, typically, the slave processor has a buffer 19 assigned to it at initialization to hold the first message image. Then, when the acquire/release buffer procedure is invoked, the slave releases the buffer which is assigned to it by updating its status to "newest", and acquires an "idle" buffer to hold the next update of the message.

The procedure by which a single host processor 1 acquires the message updates passed by the slave processor 3 is the same as that described above for receipt by the slave processor of message updates passed by the host processor.

Figure 2:
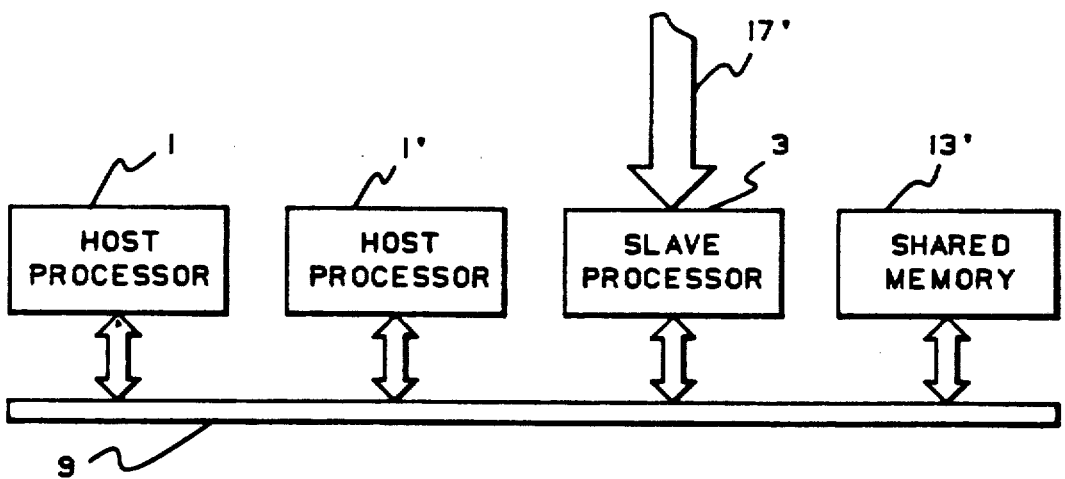
FIG. 2 is a block diagram of a modified form of the multiprocessor system of claim 1 also incorporating the invention.
Figure 4A:
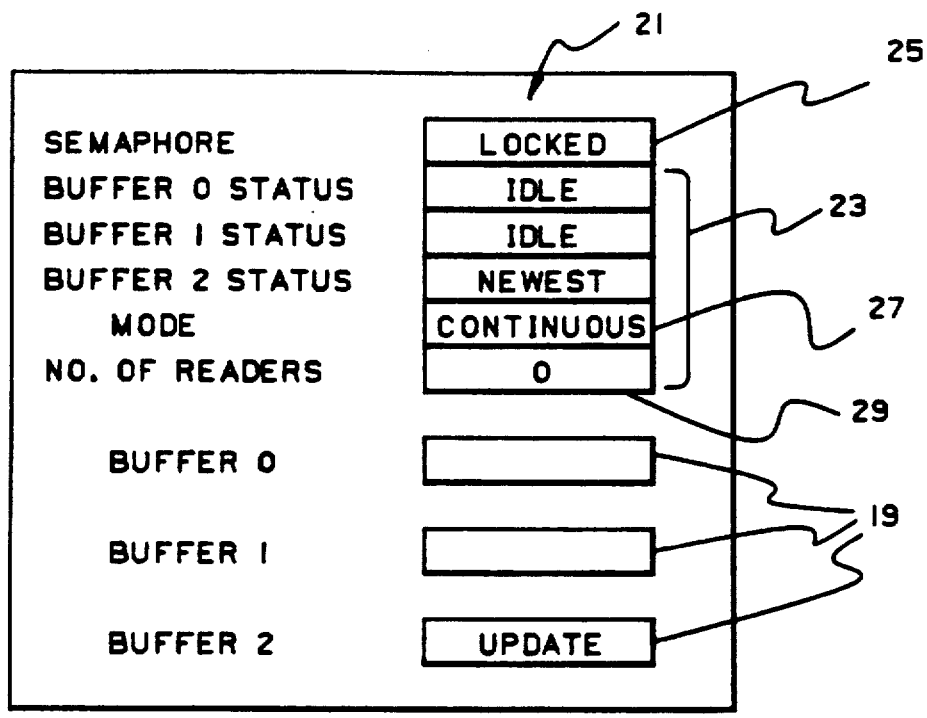
Figure 4B:
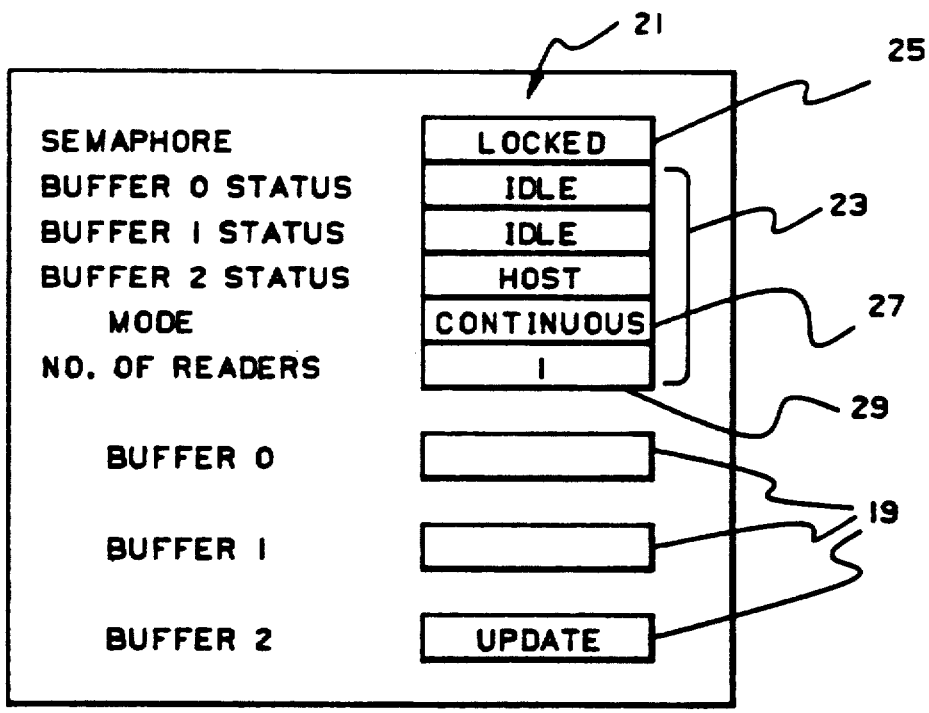
Figure 4C:
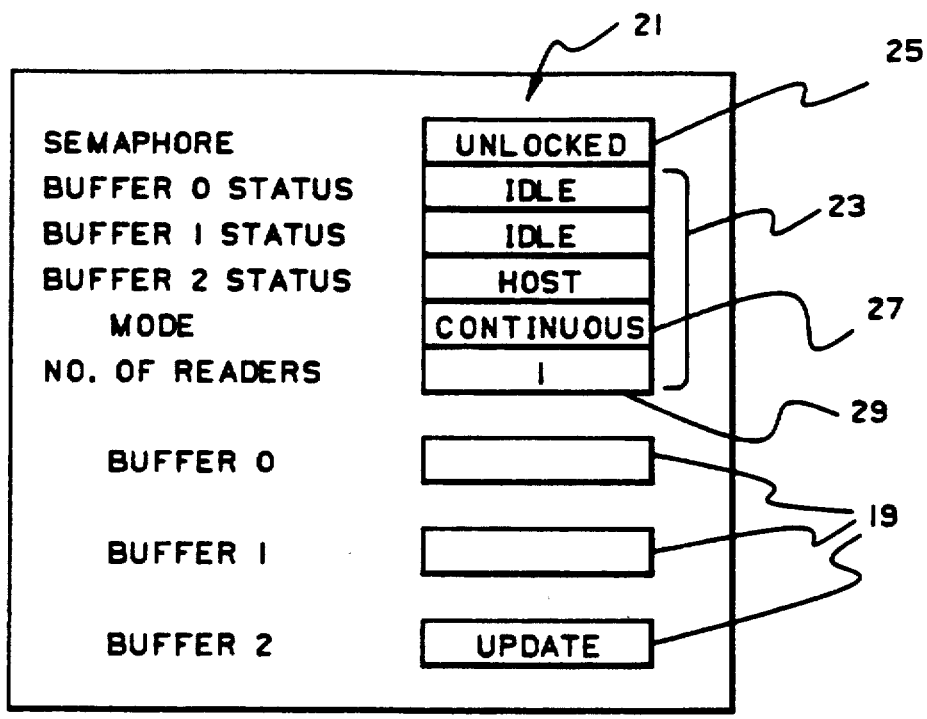
Figure 4D:
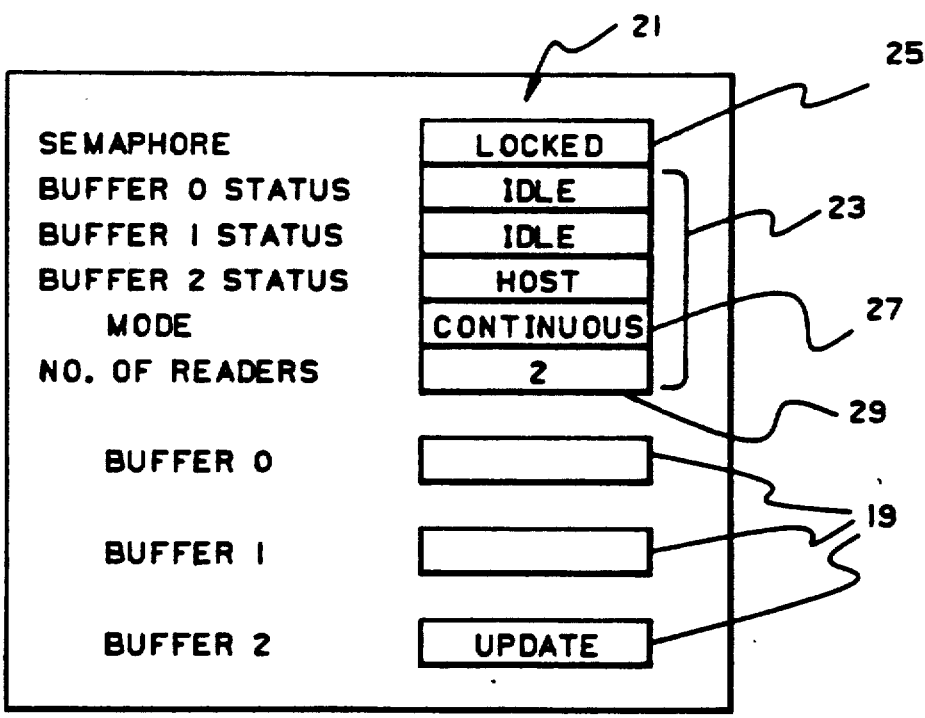

When, as shown in FIG. 2, there are multiple processors 1 and 1' receiving message updates from the same slave processor 3 through a common shared memory 13, the slave processor operates the same as when there is only one host processor. However, the multiple host processors 1 and 1' must share the "newest" message image passed by the slave processor 3. Steps must be taken to preclude release of the buffer 19 with the "newest" message image if another processor is still reading the update. This is accomplished by adding to the buffer descriptor table 21 another index 29 labeled "number of readers" which tracks the number of host processor reading the "newest" message update. Thus, multiple host processors use the following procedure illustrated in FIGS. 4a-4f through when receiving message updates from a common slave processor:

1. Host processor 1 acquires the semaphore 25 as shown in FIG. 4a.
2. A search is made of the buffer array 23 for a buffer 19 with a status of "assigned to host". If such a buffer does not exist, a buffer with a status of "newest", Buffer 2 in the example, is assigned a status of "assigned to host", as shown in FIG. 4b. In either case, the number of readers index 29 is incremented by one as indicated in FIG. 4b.
3. Host 1 releases the semaphore 25, as indicated in FIG. 4c.
4. Host 1' acquires the semaphore 25.
5. Host 1' searches for a buffer 19 with a status of "assigned to host". Since such a buffer exists, Buffer 2, it is used simultaneously by both host processors, 1 and 1', and the number of readers index is incremented to a count of 2 as shown in FIG. 4d. If an "assigned to host" buffer did not exist, a "newest" buffer, if one existed, would have been marked as "assigned to host".
6. Host 1' releases the semaphore 25.

Figure 4E:
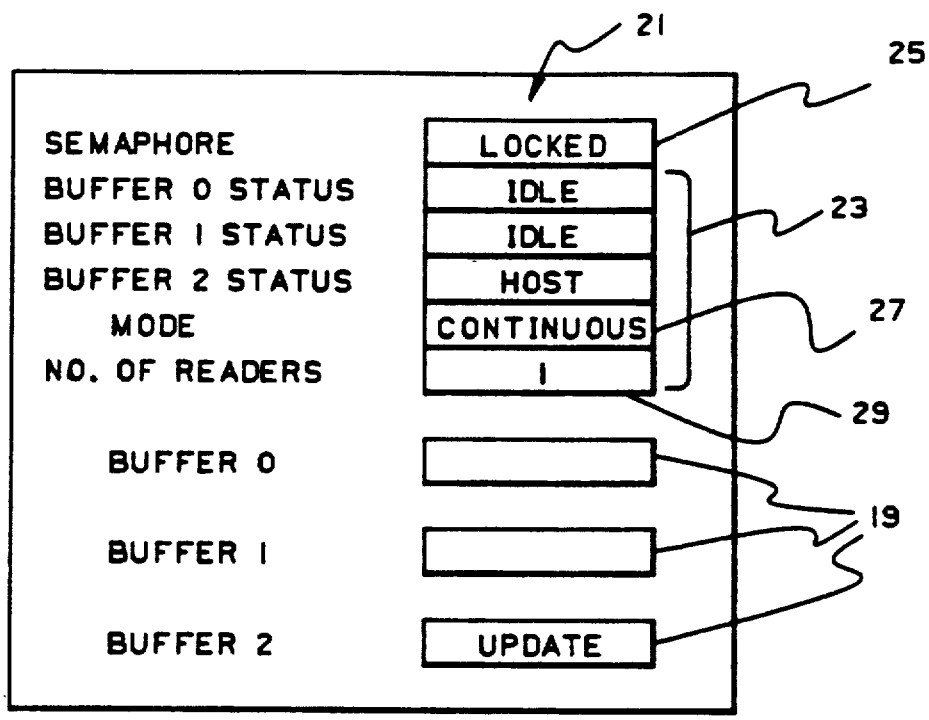
Figure 4F:
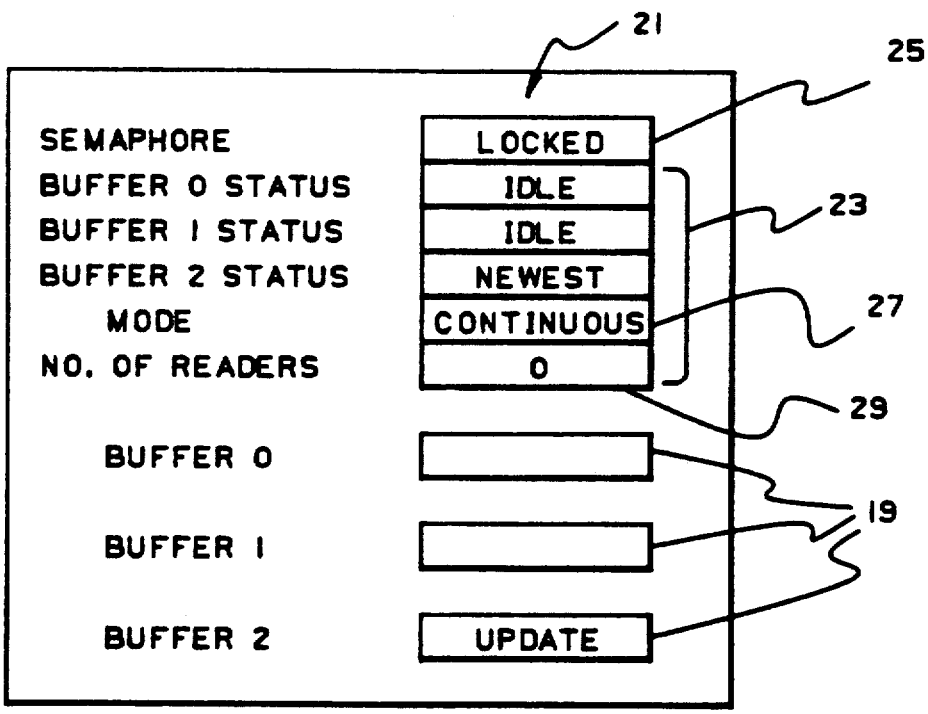

Both host 1 and host 1' copy the updated message image from the buffer with a status "assigned to host", Buffer 2. The procedure which Host 1 and Host 1' follow to release the buffer is as follows:

7. Host 1 acquires the semaphore 25.
8. Host 1 decrements the number of readers index 29, to a count of 1 in the example as shown in FIG. 4e.
9. Since the number of readers index 29 is not equal to zero, indicating that another host processor is also using the "assigned to host" buffer, host 1 releases the semaphore 25.
10. Host 1' acquires the semaphore 25.
11. Host 1' decrements the number of readers index 29.
12. Since the number of readers index 29 is now zero, the status of the "assigned to host" buffer, Buffer 2 must be changed. If a "newest" buffer exists, the "assigned to host buffer" is marked as "idle"; otherwise it is marked as "newest" as shown in FIG. 4f.
13. Host 1' releases the semaphore 25.

When multiple host processors are receiving updates of the same message, the mode must be "continuous" so that the "newest" message image is available for other host processors. If the modes selection were configured to "single shot" one host processor could essentially prevent the other host processor from ever accessing data. In addition, a timing constraint must be placed on the amount of time that any of the multiple hosts is allowed to access a buffer. This constraint is necessary so that a buffer which is assigned to multiple host processors is guaranteed to be released by all hosts at least once per host processing cycle. For a system with n host processors, the amount of time any host processor may assign a buffer to itself must be less than 1/nth of the host CPU cycle time.

In the pure triple buffering scheme described above, three buffers are used for each message. Separate buffers are used for messages passing from host to slave and those passing from slave to host. The processor which is passing the message can be considered as the sender processor and the processor to which the message is sent as a receiver processor. Thus it can be seen that messages can be passed in either direction, and the host and slave processors each can be either a sender or a receiver processor.

The basic method of applying triple buffering to shared memory communication of data images between processors can be modified to suit the particular needs of different types of slave processor boards. As previously mentioned, the slave processors are typically designed to off load the functional processors from performing standard system tasks. Two common slave processor functions are simplex-point-to-point (data link) communications, and data highway communications. Slave processors assigned these functions can benefit from variations in simple shared memory triple buffering: data link controllers due to multiple communication channel considerations, and data highway controllers due to the fact that data is received or transmitted from local memory areas under hardware control.

MULTIPLE CHANNEL SLAVES

2n+1 Triple Buffering

A slave processor of the data link controller type generally has greater than one physical communication device on the processor board. Each of the physical communication channels (data links) operate as a transmitter, receiver, or bidirectional channel. It is also possible that multiple messages are to be communicated over a single physical channel.

Triple buffering is applicable to data link controller communications because the slave processor must not wait for a message on any given channel as this prohibits servicing of the remaining channels on the data link controller. Because data link activity is serial, only one message at a time among multiple messages can be transmitted or received on any given channel. Thus, triple buffering may be implemented by providing for each data link channel a number of buffers equal to two times the number of unique messages communicated over that channel plus 1. The "extra" buffer is for the physical channel itself, i.e., the buffer into which messages are received or from which messages are transmitted. In this arrangement, the shared memory buffers are in a free pool of buffer space, and are not associated with a particular buffer descriptor table except at initialization. At initialization, two shared memory buffers are assigned to each buffer descriptor table, and are initialized to the "idle" state. The third buffer status in each buffer descriptor table is initialized to the "assigned to slave" state, since the third buffer for all buffer descriptor tables associated with a single channel corresponds to the single "extra" buffer which is assigned to the physical channel. In this case, the "assigned to slave" buffer status can be thought of as "assigned to the physical channel". Because the buffers are not rigidly allocated to a particular buffer descriptor table, the size of each of the allocated buffers must be at least as large as the largest message received or transmitted over the given channel. At any given time, two buffers are associated with each particular message, and the third buffer is always assigned to the data link controller physical communications device. When triple buffering is implemented in this manner, the method of acquiring and releasing buffers from the host side is identical to that previously described. From the data link controller side, buffer acquisition and release is a "swapping" process.

On data link controller receive channels, messages are received over the data link and must be marked for use by the host processor. The messages are received into the shared memory buffer assigned to the physical channel. As in the standard slave-to-host message passing situation, the physical communications device on the data link controller channel typically has a buffer assigned to it at initialization to hold the first message. Once a new message has been received, the data link controller must determine which buffer descriptor table the message is associated with, and find the correct table. It is to this buffer descriptor table that the "assigned to slave" buffer must be returned and from which an "idle" buffer must be acquired to rearm the physical channel. Once the correct buffer descriptor table is found, the procedure which the data link controller follows to release its current buffer and acquire an "idle" buffer is identical to standard triple buffering. However, the individual buffers "float" from one descriptor table to another as the serial messages are passed to the host processor.

An example of slave-to-host message passing using 2n+1 buffering is shown in FIGS. 5 and 6. As can be seen from FIG. 5 shared memory 13 contains a buffer descriptor table 21 for each message, and includes in addition to semaphore 25 and buffer status entries, the buffer locations or identifications (IDs) 31 for the buffers 19 assigned to that descriptor table. In the example, there are two messages, message one and message two, and hence five buffers A-E. Buffers A and B are initially assigned to message 1 and buffer C and D are assigned to message 2. Buffer E is assigned to the channel and is initially the common buffer. It will be noticed that the third or common buffer is unidentified in the message buffer descriptor tables 21 and 21'. Identification of this common buffer is maintained in local memory 33 of the slave processor as indicated in FIG. 6.

Figure 5A:
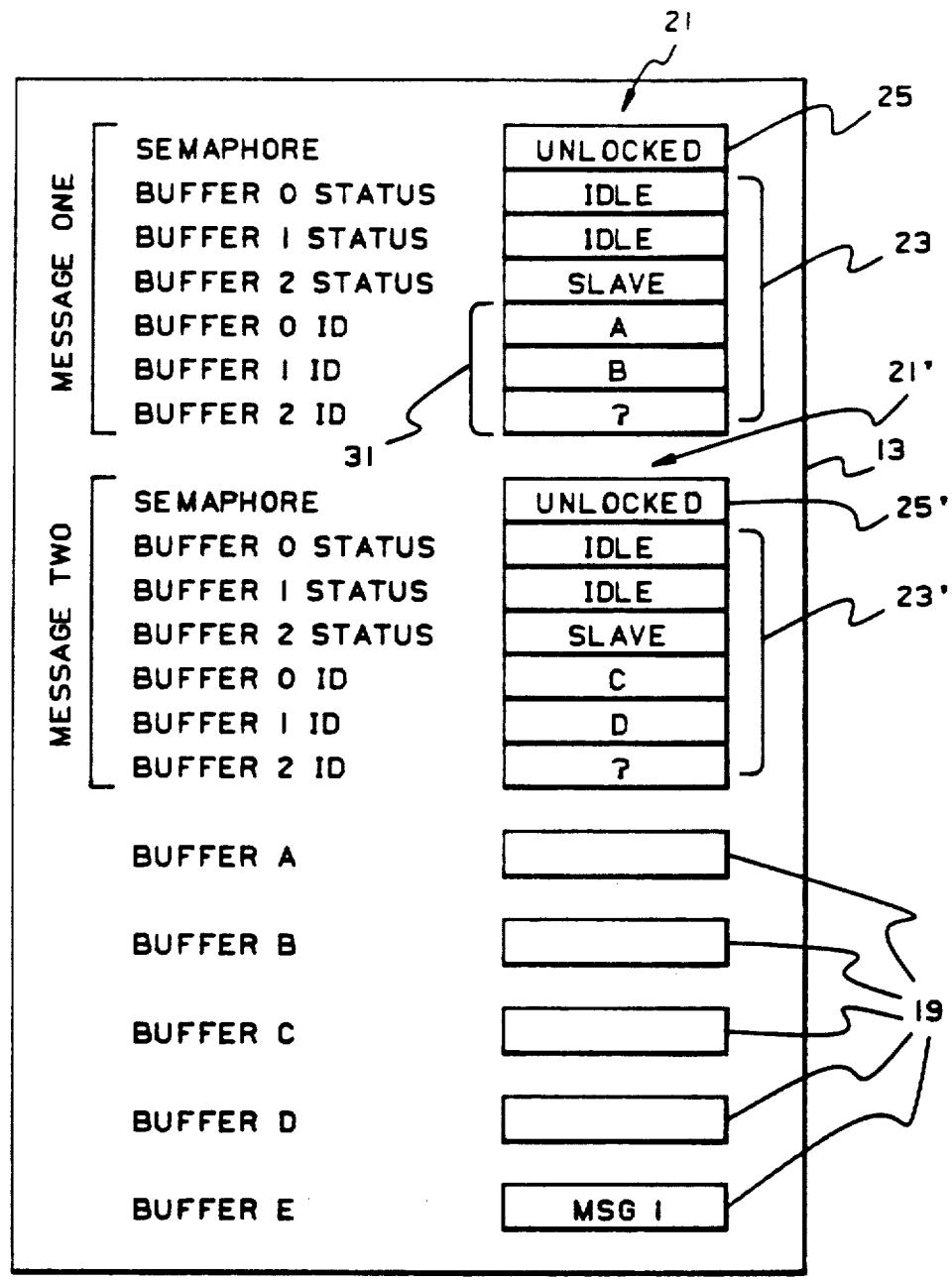
Figure 6A:
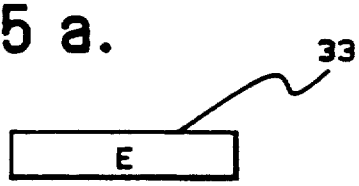
Figures 5B, 6B:
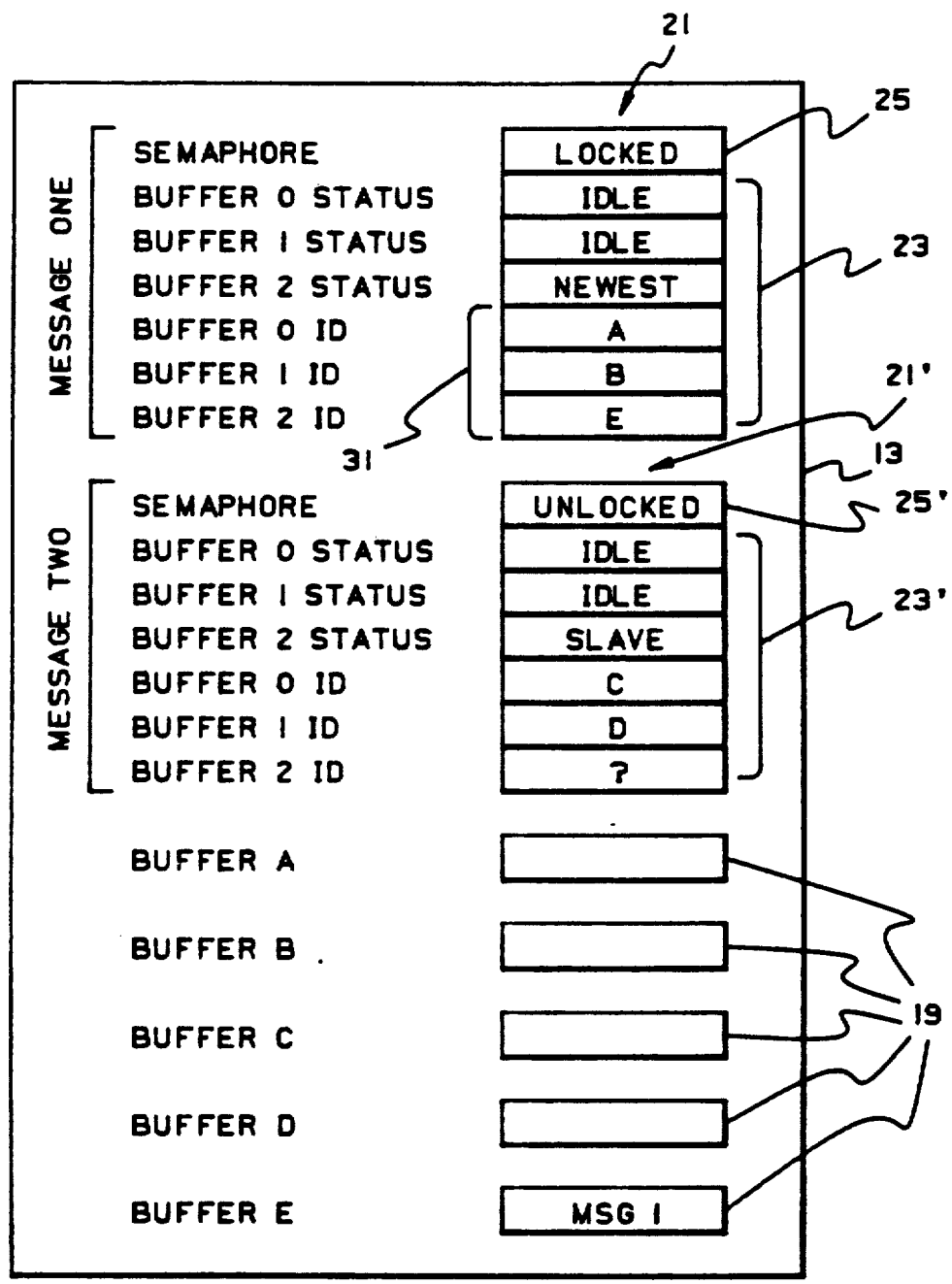
Figure 5C:
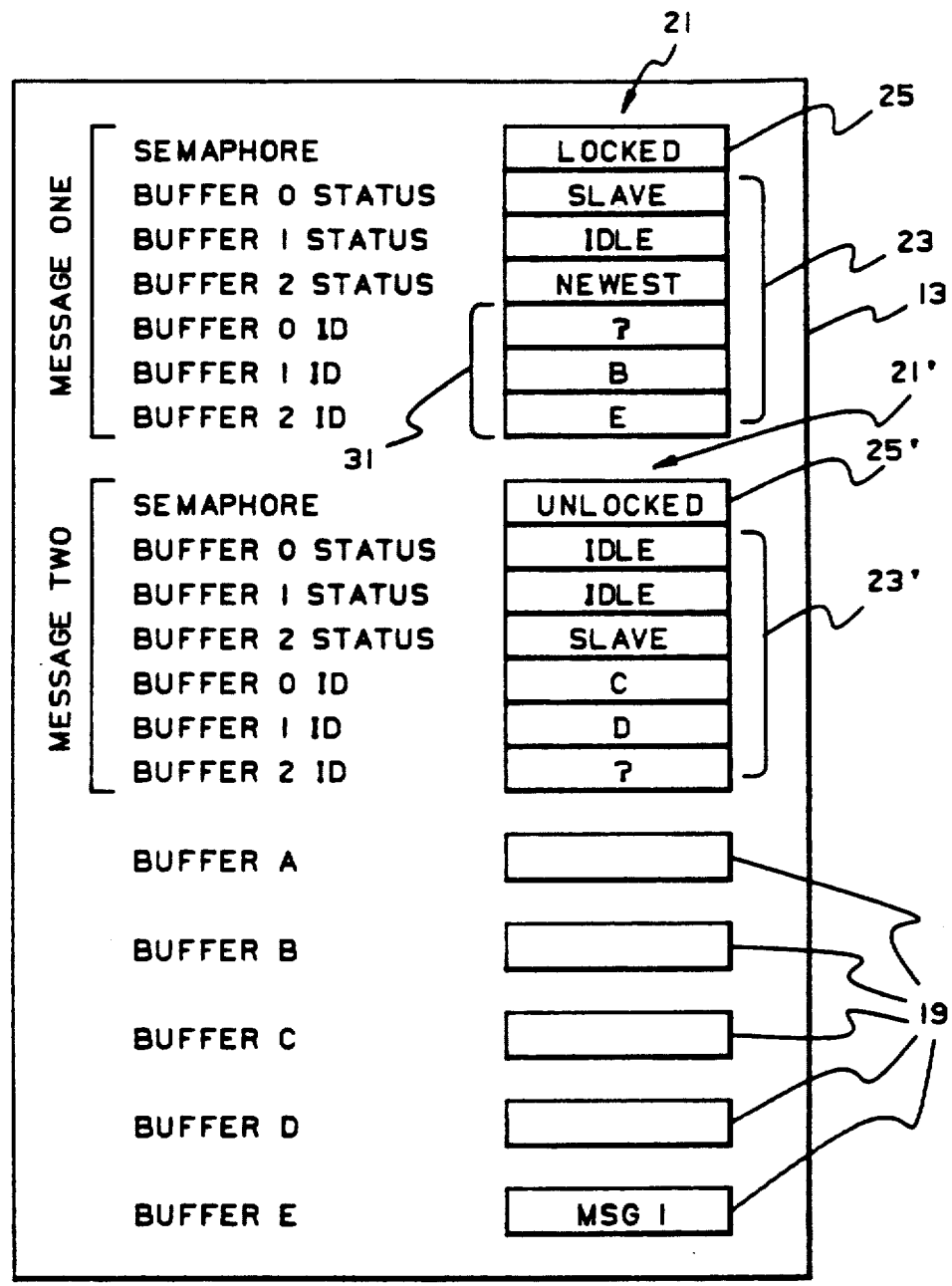
Figure 6C:
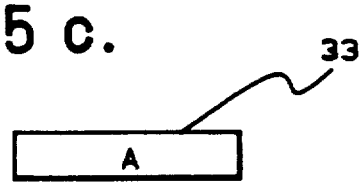

The actions which must be taken by the slave processor in order to mark a received message for use by the host are as follows:

1. The slave processor 3 receives messages into the shared memory buffer assigned to the physical channel, which in the example is buffer E as shown in FIGS. 5a and 6a. Once a new message has been received, the slave processor must determine which buffer descriptor table 21, 21' this message is associated with, using information contained in the message header. The slave processor must then find this buffer descriptor table. In the example, this is the descriptor table 21 associated with message 1.
2. The appropriate buffer descriptor table semaphore 25 is acquired.
3. The buffer status array 23 in this buffer descriptor table 21 is searched for a buffer 19 with a status of "newest". If a "newest" status is found, then the data which was received replaces this buffer, so the buffer status of "newest" is changed to "idle".
4. The buffer status array 23 is then searched for a buffer with a status of "assigned to slave". If a buffer with the status of "assigned to slave" is not found, then an error has occurred.
5. The ID 31 of the buffer whose status is "assigned to slave" is set to the channel buffer ID (buffer E in the example). The status of the "assigned to slave" buffer is changed to "newest", as shown in FIG. 5b.
6. The buffer status array is then searched for a buffer 19 with a status of "idle. The buffer 19 whose status is "idle" is acquired by the slave processor 3 in order to rearm the channel. If an "idle" buffer is not found, then an error has occurred. The slave processor acquires the shared memory buffer by changing its status from "idle" to "assigned to slave" as shown in FIG. 5c. The buffer identification of the common buffer which is assigned to the communications channel is assigned the buffer ID 31 of the buffer 19 which is now "assigned to slave", which is buffer A in the example as shown in FIG.
7. The semaphore 25 is then released.

Figures 5D, 6D:
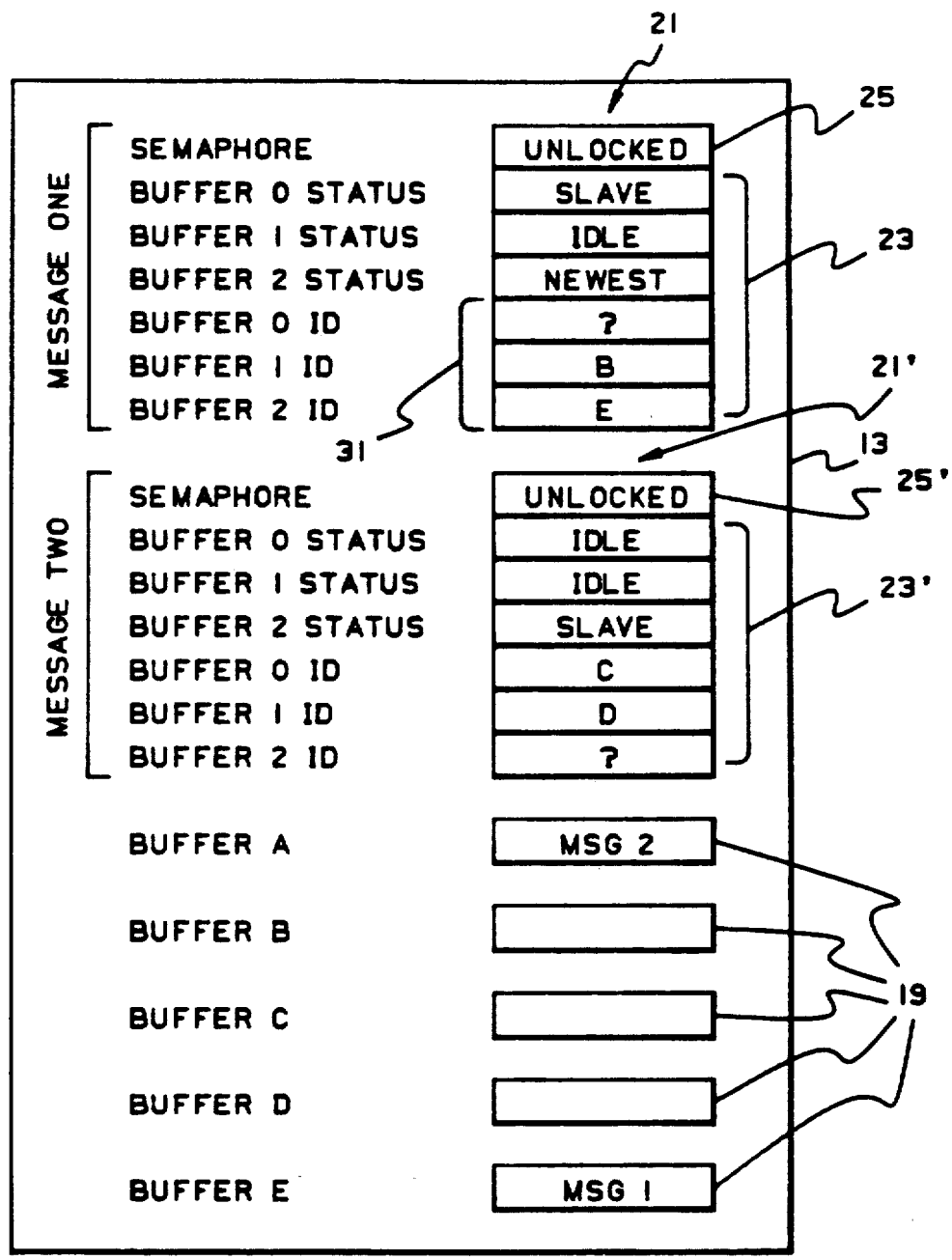
Figure 5E:
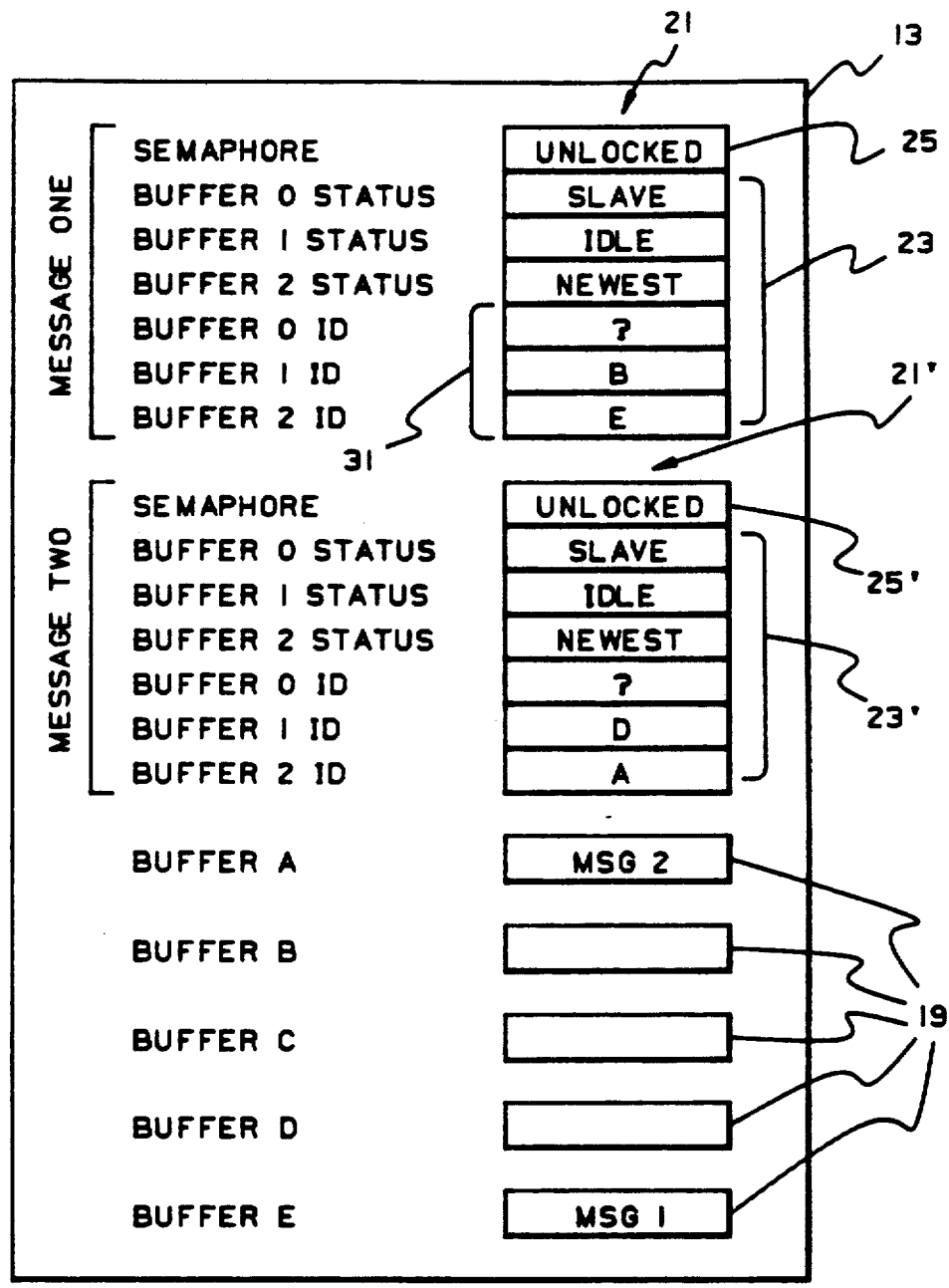
Figure 6E:
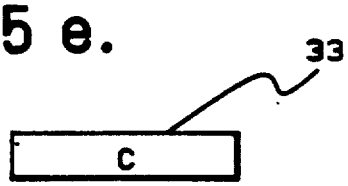

The next message received by the slave, which in the example is an update of message two, is received in the common buffer A as shown in FIG. 5d. The slave processor 3 then goes through the steps just described above to acquire the semaphore 25' for the message two buffer descriptor table 21', to swap buffer A containing message two with an idle buffer, C. Buffer C becomes new common buffer. The slave processor also marks buffer A, as containing the "newest" update of message two, and identifies the swapped buffer position, Buffer 0, as "assigned to slave". The result is shown in FIGS. 5e and 6e. It will be noticed from these figures that buffer A which was originally assigned to the buffer descriptor table 21 for message 1 is now assigned to buffer descriptor table 21' for message 2.

The method by which the host processor acquires inbound messages for its use is the same regardless of the type of slave processor with which it is communicating. Hence, the host processor, or even multiple host processors, acquire and release buffers in receiving messages from the slave processor using 2n+1 triple buffering in shared memory in the same manner as discussed above in connection with pure triple buffering.

For outbound messages, that is where the host passes messages to the slave to be transmitted on the datalink, the host processor operates as in the case of pure triple buffering. The slave processor, however, must check each buffer descriptor table associated with the physical channel for a buffer with a message update to transmit. Each unique message associated with a channel is transmitted as a separate message. Datalink controllers cannot perform successive transmissions on one channel on the same cycle due to interframe spacing requirements. Hence, only one message update is transmitted for each processing cycle of the slave processor. Thus, the slave processor must maintain an index of the last buffer descriptor table from which data was transmitted, such that messages are transmitted in order. Each processing cycle, the slave polls the buffer descriptor tables for each channel, starting with the buffer descriptor table following the one associated with the last message transmitted, until it finds a buffer descriptor table with data to be transmitted. The host processor can mark which message updates are to be transmitted by another entry in the buffer descriptor tables (not shown in the drawings). In such a case, the slave only transmits those data from those buffers which have been enabled for transmission by the host processor.

Figure 7B:
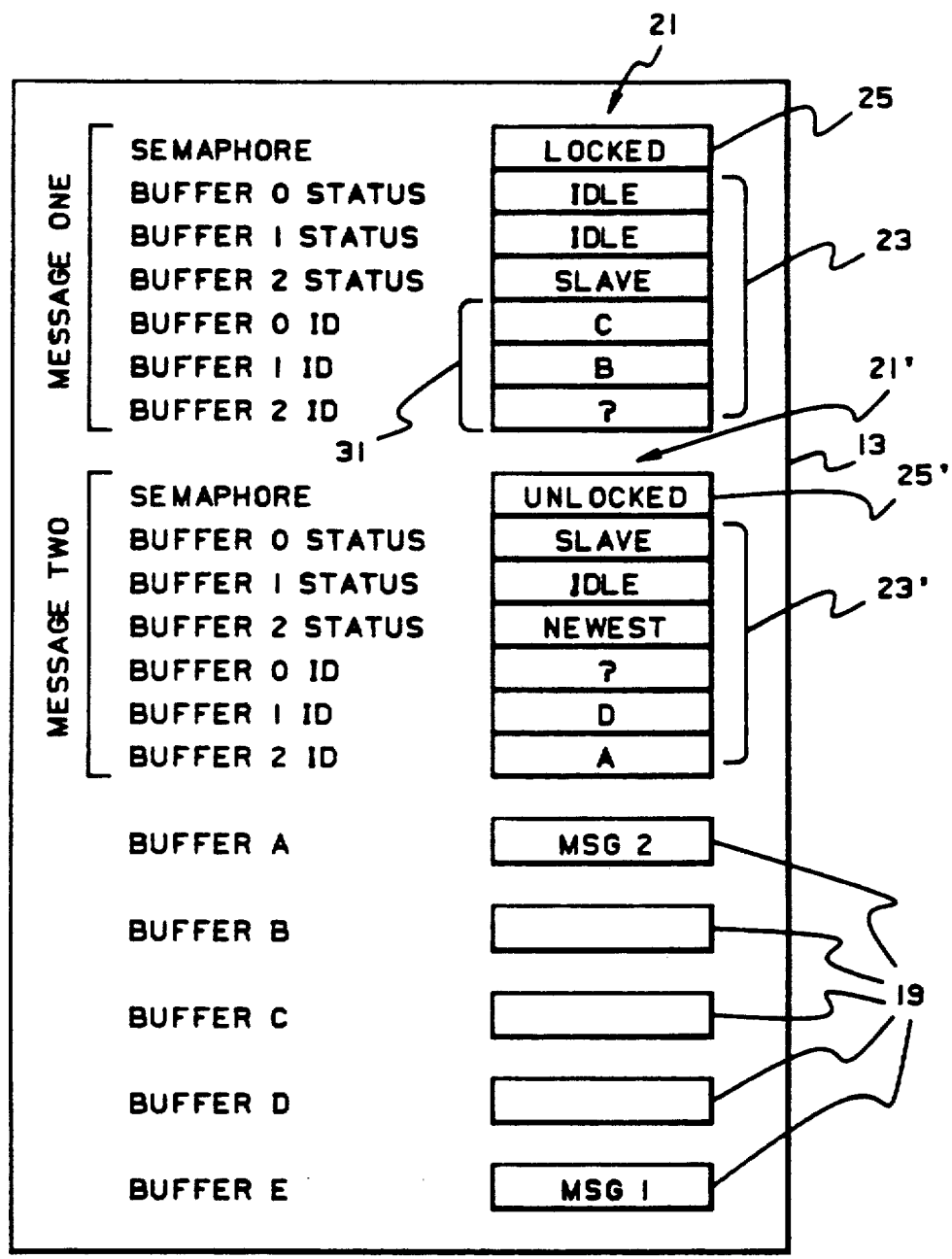
Figure 8B:

The action which must be taken by the slave processor in order to access new messages to be transmitted are as follows, and are illustrated in FIGS. 7 and 8:

1. The appropriate buffer descriptor semaphore 25 is acquired. FIGS. 7a and 8a illustrate a situation in which the host processor 1 has placed updated images of messages 1 and 2 in shared memory for the slave processor to transmit. In the example, the semaphore 25 for message 1 is acquired first.
2. The buffer status array 23 in this buffer descriptor table 21 is searched for a buffer 19 with a status of "newest". If a "newest" status is found, then the slave processor 3 must swap the current "assigned to slave" buffer with the "newest" buffer so that the slave can transmit the newest data. The buffer status of the "assigned to slave" buffer, Buffer 0, is changed to "idle", and its buffer ID 31, is updated to the ID, C of the current buffer 19 which is assigned to the communications channel itself. The buffer status of the "newest" buffer, Buffer 2, is changed to "assigned to slave". These actions are illustrated in FIGS. 7b and 8b.
3. The semaphore 25 is then released.
4. The transmission of the "assigned to slave" buffer data is initiated. Upon the completion of transmission, the buffer must be returned such that the host processor can reuse it.
5. The appropriate buffer descriptor semaphore 25 is acquired. The appropriate buffer descriptor table 21 is the one corresponding to the data just transmitted.
6. The buffer status array 23 is searched for a buffer with a status of "newest". If a buffer status of "newest" is found or if the Mode byte in the buffer descriptor table is equal to "single shot", then the buffer which is presently "assigned to slave" remains in that state. Otherwise, the status of the buffer, Buffer 2 in the example, which is "assigned to slave" is changed back to "newest", and its ID 31 is updated to the ID of the current buffer which is assigned to the communications channel. This action is taken because the message image in the buffer assigned to the communications channel is still the "newest" data. The buffer status array 23 is then searched for a buffer 19 with a status of "idle". This buffer is acquired for use by the slave by changing its status to "assigned to slave", Buffer 0. The current buffer ID 31 of the buffer 19 assigned to the communications channel is changed to the ID of the buffer whose status is now "assigned to slave". In the example the host processor 1 had not provided another update of message 1 so that the buffer with the message transmitted has been returned to the buffer descriptor table 21 for message 1 and shared memory 13 returns to the configuration as shown as FIG. 7a and 8a.
7. The semaphore 25 is then released.

Similar steps are followed by the slave processor 3 in acquiring the updated image of message 2 for transmission.

The triple buffering procedure followed by slave processors similar to datalink controllers is just an extended version of simple shared memory triple buffering. However, this method drastically reduces the memory requirements when many messages must be transmitted or received on a single physical channel. It reduces to simple triple buffering when only one message is transmitted or received per channel. For a datalink controller with multiple channels, 2n+1 buffers are provided in shared memory for each message of each channel, so that it can be seen that for large number of channels each with a large number of messages, a savings in shared memory space is considerable with this modified form of triple buffering.

Dual Shared Memory/Single Local Memory Triple Buffering

Data highway controllers typically receive and transmit information from a linked list of buffers which are managed by a combination of hardware and software control. These buffers are normally located in the local memory of the controller processor, with the linked list managed under program control. The linked buffer list is required because the data highway controller hardware performs buffer prefetching when receiving data. Thus, for the data highway controller case a modified triple buffering scheme may be used. In slave-to-host message passing, only two shared memory buffers are required for each message because the third buffer in each set of triple buffers is actually a local memory buffer. Unfortunately, this leads to the need to move blocks of data from local memory into shared memory buffers, but otherwise, the fact that the third buffer is actually in local memory has no effect on the host or slave processing in terms of acquiring or releasing buffers. The only visible effects of the third buffer residing in local memory are:

1. The semaphore locked time is increased due to the necessity of performing a block move of data from the local memory buffer to one of the shared memory buffers while the buffer status array is in the locked state.
2. The buffer status of the third shared memory buffer in each buffer descriptor table, through which messages are passed from the slave-to-host, is assigned the value "unused".

An example of 2n+ local buffering is shown in FIGS. 9 and 10, where FIG. 9 illustrates the shared memory 13 in which two buffers 19' and 19" are permanently assigned to each message, and FIG. 10 illustrates a circular buffer list 35 comprising several buffers 37 implemented in hardware in the local memory of the slave processor 3. In this scheme, two shared memory buffers 19' or 19" are allocated by the slave processor 3 for each buffer descriptor table 21 and 21'. A buffer 37 becomes the third buffer for a message to be passed. The two shared memory buffers 19' or 19" are the only resources which may be accessed by the host processor 1. The two shared memory buffers 19' or 19" assigned to each buffer descriptor table 21 or 21' are always the same buffers in this arrangement.

At initialization, buffer status arrays 21, 21' for each of the buffer descriptors are initialized as follows: two shared memory buffers 19' and 19" are assigned a status of "idle" for each buffer descriptor table 21, 21', while the buffer status which would normally be associated with the third shared memory buffer is assigned the status of "unused", indicating the buffer does not exist in shared memory, as shown in FIG. 9a. One of the linked buffers 37 in local memory is designated as the "next buffer" to receive a message update as indicated in FIG. 10a.

For the dual shared memory/single local memory 1 triple buffering scheme, the action which must be taken by the slave processor 3 in order to mark received messages for use by the host processor 1 are as follows:

1. The slave processor receives messages into local data buffers 37. Once a new message has been received the slave processor 3 must determine which buffer descriptor table, 21 or 21', the received message is associated with, using information contained in the message header. The slave processor 3 accesses the appropriate buffer descriptor table 21 or 21' in order to acquire a shared memory buffer 19' or 19" in which to copy the newly received message so that the newest data can be used by the host.
2. The semaphore 25 of the appropriate buffer descriptor table 21 is acquired by the slave processor. This is the table 21 for message 1 in the example.
3. The buffer status array 23 in this buffer descriptor table 21 is searched for a buffer 19' with a status of "newest". If a buffer with a status of "newest" is found, then the data which was just received replaces this buffer so the buffer status of "newest" is changed to "idle".
4. The buffer status array 23 is searched for a buffer with a status of "idle". The status of this buffer is changed to "newest".
5. The buffer 19' with a status of "newest" is filled with the data from the local buffer. As shown in FIG. 9b.
6. The semaphore 25 of the buffer descriptor table 21 associated with the message 1 is released.

Figure 10C:
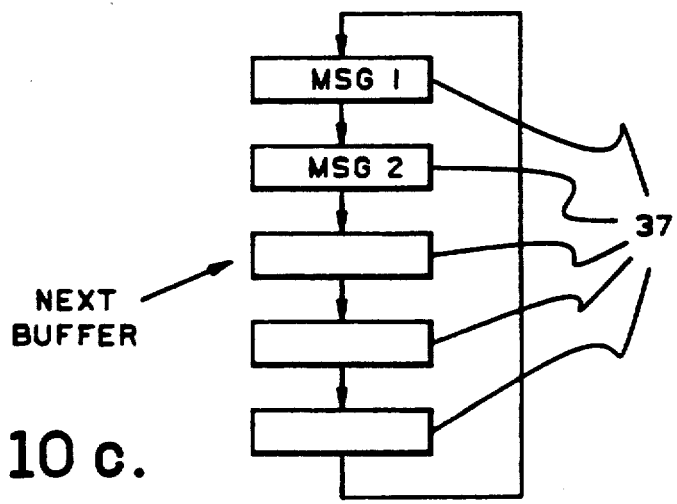

A subsequent message is received into local memory in the next buffer as illustrated in FIG. 10c. Assuming that this is an updated image of message 2, the slave processor 3 follows the same procedure as just discussed in order to enter the data in shared memory buffer C and to mark this buffer as having a status of "newest" as illustrated in FIG. 9c.

Host processor access to the message updates placed in shared memory by the slave processor can occur at any time. The host processor will always access buffers with a status of "newest". The steps taken by the host processor to access these buffers are identical to those used in the pure triple buffering case. In otherwords, the fact that 2n+ local buffering is used is transparent to the host processor.

Where the slave processor is a data highway controller, outbound message transmission, that is where the host passes message updates to the slave processor for transmission on the data highway, pure triple buffering is used. In other words, three buffers in shared memory are used for each message.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A method of transferring updated images of a message between asynchronous sender and receiver digital processors using dual port shared memory comprising the steps of:

providing two buffers in said dual port shared memory and one local buffer in a said sender digital processor;

operating the sender digital processor asynchronously of the sender digital processor to send updated message images to a receiver processor by receiving the newest updated message image in said local memory, assigning an available one of the shared memory buffers to itself, filling the assigned buffer with the newest updated message image in the local buffer, and then releasing the buffer in shared memory assigned to it as the buffer with the newest updated message image to make the newest updated message image available for the receiver processor;

operating the receiver digital processor to receive updated message images from the first processor by assigning to itself the shared memory buffer with the newest updated message image, reading the newest updated message image, and releasing such buffer to make it available for the sender processor; and permitting only one processor at a time to assign or release buffers in said shared memory; or to fill a shared memory buffer with an updated message image.

2. The method of claim 1 for transferring a plurality of messages from the sender processor to the receiver processor including:
providing a set of two buffers in said dual port shared memory and local buffers in the sender processor for receiving the messages;
operating the sender processor to receive each updated message image in a local memory buffer, to determine the set of buffers in shared memory associated with that message, and to perform the steps of claim 1 for each message, and
operating the receiver processor to perform the steps of claim 1 sequentially for each message.

3. In combination,
a sender digital processor having a local memory;
a receiver digital processor which operates asynchronously from the sender processor;
dual port shared memory connected to the sender and receiver processors and having two buffers, said sender processor being programmed to receive a newest updated message image in said local memory, to assign an available one of the shared memory buffers to itself to fill the assigned buffer with the newest updated message image data in the local memory, and to release the buffer in shared memory assigned to it as the buffer with the newest updated message image and said receiver processor being programmed to asynchronously of the sender processor assign to itself the shared memory buffer with the newest updated message image, to read the newest updated message and to release such buffer to make it available for the sender processor; and
means permitting only one processor at a time to assign, release shared memory buffers or to fill a shared memory buffer with an updated message image.

4. The combination of claim 3 including a data highway connected to said sender processor to successively transmit to said sender processor updated images of a plurality of messages, wherein said local memory includes a plurality of linked buffers which successively receive updated message images from said data highway and wherein said dual port shared memory includes a set of two buffers assigned to each of said plurality of messages, said sender processor being further programed to successively assign to itself an available buffer from the set of buffers in shared memory assigned to each successive message to be passed to the receiver processor.

5. A method of transferring updated images of n messages between asynchronous digital processors using buffers in dual port shared memory comprising the steps of:
maintaining for each message an assigned status table for selectively assigning to associated buffers a status indicating that a buffer is assigned to a sender processor, assigned to a receiver processor, idle, or contains the newest updated message image;
initially allocating two buffers with an idle status to each message and assigning one buffer as a common buffer for all of the messages and indicating in each of the status tables that it is assigned to the sender processor.
limiting access to the status table to only one processor at a time;
operating the sender processor to:
receive one of the n messages in the common buffer assigned to it;
determine the status table associated with the message from the content of the message;
acquire access to the associated status table;
search the associated status table for a buffer assigned a status indicating it contains the newest updated message image and if such a buffer is found change its status to the idle status;
search the associated status table for a buffer assigned a status of assigned to the sender processor and change its status to a status indicating it contains the newest updated message image;
search the associated status table for a buffer with an idle status and change it to a status of assigned to the sender processor; and
release access to the associated status table; and
operating the receiver processor to:
acquire access to the associated status table;
search the associated status table for a buffer assigned a status indicating it contains the newest updated message image and change its status to a status of assigned to the receiver processor;
release access to the associated status table;
copy the updated image of the message from the buffer assign the status of the assigned to the receiver processor;
reacquire access to the associated status table;
search the associated status table for a buffer assigned a status indicating it contains the newest updated message image and if such a buffer is found then change the status of the buffer with a status of assigned to the receiver processor to a status of idle, and if no buffer is found with a status indicating it contains the newest updated message image, change the status of the buffer with a status of assigned to the receiver processor to a status indicating it contains the newest updated message image.

6. A method of transferring updated images of n messages between asynchronous digital processors using buffers in dual port shared memory comprising the steps of:
maintaining for each message an assigned status table for selectively assigning to associated buffers a status indicating that a buffer is assigned to a sender processor, assigned to a receiver processor, idle, or contains the newest updated message image;
initially assigning in the status tables for each message two buffers with a status of idle and assigning a common buffer as assigned to the receiver processor in each buffer status table;
limiting access to each of the buffer status tables to only one processor at a time;
operating the sender processor to:
locate the status table associated with the message to be passed to the receiver processor;
acquire access to the associated status table;
search the associated status table for a buffer assigned the idle status and change its status to a status of assigned to the sender processor;
release access to the associated status table;
enter an updated image of the message to be passed into the buffer assigned to the sender processor;
reacquire access to the associated status table;
search the associated status table for a buffer assigned a status indicating it contains the newest updated message image and change its status to the idle status; and change the status of the buffer assigned a status of assigned to the sender processor to a status indicating it contains the newest updated message image; release access to the associated status table; and operating the receiver processor to:

locate the status table with the message to be passed; acquire access to the associated status table;

search the associated status table for a buffer assigned a status indicating it contains the newest updated message image and swap the assigned status of this buffer with the status of the buffer with a status of assigned to the receiver processor by changing the status of the buffer with a status of assigned to the receiver processor to a status of idle and changing the status of the buffer with a status of indicating it contains the newest updated message image to a status of assigned to receiver;

release access to the associated status table;

copy the updated image of the message from the buffer assigned the status of assigned to the receiver processor;

reacquire access to the associated status table; and search the associated status table for a buffer with a status indicating it contains the newest updated message image and if such a buffer is not found then change the status of the buffer with a status of assigned to receiver to a status indicating it contains the newest updated message image and search the associated status array for a buffer with a status of idle and change status to a status of assigned to receiver; and release access to the associated status table.

7. A method of transferring updated images of a message between asynchronous digital processors using dual port shared memory comprising the steps of:

providing three buffers in said dual port shared memory, and initially assigning one buffer to a sender processor;

operating the sender processor to enter the updated image of the message int he assigned buffer, to release the assigned buffer as the buffer with a newest updated message image to make the updated message image available to a receiver processor, and to assign to itself an available one of said three buffers for the next updated message image;

further operating the sender processor to, prior to releasing the buffer with the newest updated message image, determine if there is another buffer which has been previously released with an indication that it is the buffer with the newest updated message image, and if there is, removing the indication from said previously released buffer that it is the buffer with the newest updated message image;

operating the receiver processor asynchronously of the sender processor to assign the buffer with the newest updated message image to itself, to copy the newest updated message image and to then release such buffer to make it available for the sender processor;

further operating the receiver processor after copying the updated message image from the buffer assigned to it, to determine if there is another buffer released by the sender processor having a newer updated image of the message than the image in the buffer assigned to the receiver processor, and if not, to release said buffer assigned to the receiver processor as a buffer containing the newest update of the message image, which buffer can be reassigned to the receiver processor if no other buffer with a newer updated message image has been released by the sender processor when the receiver processor again is operated to receive a message image;

permitting only one processor at a time to assign to itself and release buffers; and transmitting updated message images from the sender processor to a plurality of receiver processors, by maintaining a reader index for tracking the number of receiver processors reading an updated message image, and operating each receiver processor to assign a buffer to the receiver processors only if no other buffer is already assigned to a receiver processor, to increment the reader index to copy the updated message image from the buffer assigned to the receiver processors, to decrement the reader index prior to releasing a buffer assigned to the receiver processors and to release a buffer assigned to the receiver processors only if the reader index is zero.

8. A method of transferring updated images of a message between asynchronous digital processors using dual port shared memory comprising the steps of:

providing three buffers in said dual port shared memory, and initially assigning one buffer to a sender processor;

operating the sender processor to enter the updated image of the message in the assigned buffer, to release the assigned buffer as the buffer with a newest updated message image to make the updated message image available to a receiver processor, and to assign to itself an available one of said three buffers for the next updated message image;

operating the receiver processor asynchronously of the sender processor to assign the buffer with the newest updated message image to itself, to copy the newest updated message image and to then release such buffer to make it available for the sender processor;

permitting only one processor at a time to assign to itself and release buffers; and transmitting updated message images from a sender processor to a plurality of asynchronously operated receiver processors by operating each of said receiver processors to only assign a buffer to the receiver processors if no buffer is already assigned to the receiver processors, and to otherwise read the updated message image in the buffer already assigned to the receiver processors; and to not release the buffer assigned to the receiver processors when any other receiver processor is copying an updated message image from the buffer assigned to the receiver processors.

9. A method of transferring n serially transmitted updated images of n messages between asynchronous digital processors using dual port shared memory comprising the steps of:

providing 2n+1 buffers in said dual port shared memory;

initially assigning a set of 2 buffers selected from said 2n+1 buffers to each message and assigning the remaining buffer to each message as a common buffer assigned to a sender processor;

operating the sender processor to receive an updated one of said messages in said common buffer assigned to it, to determine the set of buffers assigned to the received message, to release the assigned buffer as the buffer with a newest updated message image to make the updated message image available to a receiver processor by swapping the common buffer with an available buffer assigned to that message which then becomes the common buffer assigned to the sender processor;

operating the receiver processor asynchronously of the sender processor to serially assign buffers with the newest updated message image associated with each message to itself, to copy the newest updated message images and to then release such buffers to make them available for the sender processor;

permitting only one processor at a time to assign to itself and release buffers; and operating the receiver processor to acquire the message updates by serially assigning to itself buffers with message updates associated with each message.

10. The method of claim 9 wherein said sender processor is a communications processor for controlling messages on a plurality of physical communication channels each of which carries n messages, wherein n is a variable having an independent value for each channel, said method including: providing 2n+1 buffers in said dual port shared memory for each channel, and operating said sender processor and receiver processor to perform the steps of claim 6 for each channel.

11. A method of transferring updated images of n messages between asynchronous digital processors using dual port shared memory comprising the steps of:

providing 2n+1 buffers in said dual port shared memory;

initially assigning a set of two buffers to each of said n messages and assigning the remaining buffer to each message as a common buffer assigned to a receiver processor;

operating the sender processor to determine the set of buffers assigned to a message to be transmitted and assigning to itself an available buffer in such set of buffers and to release the assigned buffer as the buffer with a newest updated message image to make the updated message image available to a receiver processor;

operating the receiver processor asynchronously of the sender processor to locate the set of buffers assigned to a message to be received, assigning to itself the buffer from the located set with the newest updated message image by swapping the common buffer assigned to the receiver processor with the buffer with the newest updated message image to copy the newest updated message image and to then release such buffer to make it available for the sender processor; and permitting only one processor at a time to assign to itself and release buffers.

12. The method of claim 11 further including:

operating said receiver processor to, after extracting the message update from the buffer assigned to it, determine if one of the two buffers assigned to the associated message has a newer update than the update in the buffer assigned to it and if not, to swap the buffer assigned to it with an available buffer assigned to the associated message to retain as a latest update for the associated message the update in the buffer which had been the buffer assigned to the receiver processor.

13. The method of claim 12 wherein said receiver processor is a communications processor for controlling messages on a plurality of physical communication channels each of which carries n messages, wherein n is a variable having an independent value for each channel, said method including: providing 2n+1 buffers in said dual port shared memory for each channel, and operating said sender processor and receiver processor to perform the steps of claim 9 for each channel.

14. In combination:

a sender digital processor;

a receiver digital processor which operates asynchronously from the sender processor;

a datalink channel which serially provides updates of n different messages to the sender processor to pass to the receiver processor;

a dual port shared memory connected to the sender and receiver processors and having 2n+1 buffers with a set of two buffers initially assigned to each message and the remaining buffer assigned as a common buffer to the datalink channel, said sender processor being programmed: to, when a message is to be passed to the receiver processor, enter an updated message image in said common buffer, to determine the set of buffers assigned to the updated message, and to release the buffer with the updated message image as the buffer with the newest updated message image to make the updated message image available to the receiver processor by swapping the common buffer with an available buffer assigned to that message which then becomes the common buffer assigned to the datalink channel, said receiver processor being programmed to asynchronously of the sender digital processor serially assign the buffer with the newest updated message associated with each message to itself, to copy the newest updated message images, and to release such buffers to make them available for the sender processor; and means within the dual port shared memory for permitting only one of said processors at a time to assign or release buffers.

15. The combination of claim 14 wherein said datalink comprises a plurality of channels each of which provides n messages to the sender processor to be passed to the receiver processor wherein n is a variable having an independent value for each channel, wherein 2n+1 buffers are provided in said dual port shared memory for each channel with the common buffer being assigned to the associated channel, and wherein said sender and receiver processors are programmed to serially pass updates of said n messages for each channel through the assigned buffers in the dual port shared memory.

16. In combination:

a sender digital processor;

a receiver digital processor which operates asynchronously from the sender processor;

a datalink channel which serially transmits n different messages provided by the receiver processor;

a dual port shared memory connected to the sender and receiver processors and having 2n+1 buffers with a set of two buffers initially assigned to each message and the remaining buffer assigned as a common buffer to the datalink channel, said sender processor being programmed: to, when a message is to be passed to the receiver processor, determine the set of buffers assigned to the message to be transmitted, and to then assign to itself an available buffer in such set of buffers, to release the assigned buffer as the buffer with the newest updated message image to make the updated message image available to the receiver processor, said receiver processor being programmed to asynchronously of the sender digital processor locate the buffers assigned to a message to be received, to assign to itself the buffer with the newest updated message image by swapping the common buffer assigned to the datalink channel with the buffer with the newest updated message image, and to transmit the updated message image on the datalink channel; and means within the dual port shared memory for permitting only one of said processors at a time to assign or release buffers.

17. The combination of claim 16 wherein said datalink comprises a plurality of channels each of which transmits n messages provided by the receiver processor wherein n is a variable having an independent value for each channel, wherein $2n+1$ buffers in said dual port shared memory are assigned to each channel, and wherein said sender and receiver processors are further programmed to serially pass the updates of the n messages through the dual port shared memory for transmission on said plurality of datalinks.

* * * * *